US011256854B2

(12) United States Patent
Massand

(10) Patent No.: US 11,256,854 B2
(45) Date of Patent: Feb. 22, 2022

(54) METHODS AND SYSTEMS FOR INTEGRATING MULTIPLE DOCUMENT VERSIONS

(71) Applicant: Litera Corporation, McLeansville, NC (US)

(72) Inventor: Deepak Massand, McLeansville, NC (US)

(73) Assignee: Litera Corporation, McLeansville, NC (US)

( * ) Notice: Subject to any disclaimer, the term of this patent is extended or adjusted under 35 U.S.C. 154(b) by 0 days.

(21) Appl. No.: 15/918,986

(22) Filed: Mar. 12, 2018

(65) Prior Publication Data

US 2018/0203831 A1 Jul. 19, 2018

Related U.S. Application Data

(63) Continuation of application No. 14/843,839, filed on Sep. 2, 2015, now abandoned, which is a continuation
(Continued)

(51) Int. Cl.
*G06F 40/166* (2020.01)
*G06F 16/00* (2019.01)
(Continued)

(52) U.S. Cl.
CPC ............ *G06F 40/166* (2020.01); *G06F 16/00* (2019.01); *G06F 40/197* (2020.01); *G06Q 10/10* (2013.01)

(58) Field of Classification Search
CPC ...................................... G06F 17/24
See application file for complete search history.

(56) References Cited

U.S. PATENT DOCUMENTS 3,920,895 A 11/1975 Vieri et al.
3,920,896 A 11/1975 Bishop et al.
(Continued)

OTHER PUBLICATIONS

Answer and Counterclaims and Third-Party Complaint of Deneen Martinez in *Litera Corp. v. Deneen Martinez*, No. 14-CVS-6387 (N.C. Sup. Ct., Guilford County, Sep. 2, 2014).
(Continued)

*Primary Examiner* — James J Debrow
(74) *Attorney, Agent, or Firm* — Nixon Peabody LLP

(57) ABSTRACT

Systems and methods consistent with various disclosed embodiments provide for collaborating information over a computer network. In one embodiment, a system is disclosed for collaborating information over a network. The system may include a storage device and one or more processors. The processor(s) may maintain documents in the storage device and publish content links to the documents in a workspace rendered by a collaboration platform. The processor(s) may provide content to the collaboration platform in response to a content link selection by a reviewer and receive the reviewer's changes, with the collaboration platform temporarily storing the document in a virtual memory for rendering to the reviewer and deleting it after the communication session ends. The processor(s) may synchronize the changes bi-directionally from the workspace with the original document through a collaboration document, such that the original document remains unaltered, and by re-publishing an updated content link to the workspace,

20 Claims, 10 Drawing Sheets

Related U.S. Application Data of application No. 13/423,805, filed on Mar. 19, 2012, now Pat. No. 9,348,802.

(51) Int. Cl.
*G06Q 10/10* (2012.01)
*G06F 40/197* (2020.01)

(56) References Cited

U.S. PATENT DOCUMENTS

| | | | |
|---|---|---|---|
| 5,008,853 A | 4/1991 | Bly et al. | |
| 5,129,082 A | 7/1992 | Tirfing et al. | |
| 5,146,552 A | 9/1992 | Cassoria et al. | |
| 5,204,947 A | 4/1993 | Bernstein et al. | |
| 5,315,504 A | 5/1994 | Lemble | |
| 5,321,505 A | 6/1994 | Leddy | |
| 5,341,469 A | 8/1994 | Rossberg et al. | |
| 5,515,491 A | 5/1996 | Bates et al. | |
| 5,539,871 A | 7/1996 | Gibson | |
| 5,581,682 A | 12/1996 | Anderson et al. | |
| 5,596,700 A | 1/1997 | Darnell et al. | |
| 5,596,705 A | 1/1997 | Reimer et al. | |
| 5,659,676 A | 8/1997 | Redpath | |
| 5,664,208 A | 9/1997 | Pavley et al. | |
| 5,669,005 A | 9/1997 | Curbow et al. | |
| 5,671,428 A | 9/1997 | Muranaga et al. | |
| 5,694,544 A | 12/1997 | Tanigawa et al. | |
| 5,706,452 A | 1/1998 | Ivanov | |
| 5,706,502 A | 1/1998 | Foley et al. | |
| 5,708,826 A | 1/1998 | Ikeda et al. | |
| 5,708,845 A | 1/1998 | Wistendahl et al. | |
| 5,740,444 A | 4/1998 | Frid-Nielsen | |
| 5,752,055 A | 5/1998 | Redpath et al. | |
| 5,758,313 A | 5/1998 | Shah et al. | |
| 5,761,419 A | 6/1998 | Schwartz et al. | |
| 5,761,499 A | 6/1998 | Sonderegger | |
| 5,781,732 A | 7/1998 | Adams | |
| 5,781,901 A | 7/1998 | Kuzma | |
| 5,787,175 A | 7/1998 | Carter | |
| 5,799,191 A | 8/1998 | Moriyasu et al. | |
| 5,801,702 A | 9/1998 | Dolan et al. | |
| 5,809,512 A | 9/1998 | Kato | |
| 5,860,073 A | 1/1999 | Ferrel et al. | |
| 5,864,870 A | 1/1999 | Guck | |
| 5,870,754 A | 2/1999 | Dimitrova et al. | |
| 5,878,421 A | 3/1999 | Ferrel et al. | |
| 5,890,177 A | 3/1999 | Moody et al. | |
| 5,893,126 A | 4/1999 | Drews et al. | |
| 5,911,776 A | 6/1999 | Guck | |
| 5,931,906 A | 8/1999 | Fidelibus, Jr. et al. | |
| 5,937,066 A | 8/1999 | Gennaro et al. | |
| 5,938,724 A | 8/1999 | Pommier et al. | |
| 5,944,785 A | 8/1999 | Pommier et al. | |
| 5,949,413 A | 9/1999 | Lerissa et al. | |
| 5,950,214 A | 9/1999 | Rivette et al. | |
| 5,956,736 A | 9/1999 | Hanson et al. | |
| 5,958,006 A | 9/1999 | Eggleston et al. | |
| 5,978,836 A | 11/1999 | Ouchi | |
| 5,987,469 A | 11/1999 | Lewis et al. | |
| 6,009,462 A | 12/1999 | Birrell et al. | |
| 6,014,135 A | 1/2000 | Fernandes | |
| 6,029,171 A | 2/2000 | Smiga et al. | |
| 6,064,751 A | 5/2000 | Smithies et al. | |
| 6,067,551 A | 5/2000 | Brown et al. | |
| 6,088,702 A | 7/2000 | Plantz et al. | |
| 6,088,709 A | 7/2000 | Watanabe | |
| 6,092,090 A | 7/2000 | Payne et al. | |
| 6,119,147 A | 9/2000 | Toomey et al. | |
| 6,158,903 A | 12/2000 | Schaeffer et al. | |
| 6,178,431 B1 | 1/2001 | Douglas | |
| 6,182,080 B1 | 1/2001 | Clements | |
| 6,212,534 B1 | 4/2001 | Lo et al. | |
| 6,230,171 B1 | 5/2001 | Pacifici et al. | |
| 6,236,993 B1 | 5/2001 | Fanberg | |
| 6,243,722 B1 | 5/2001 | Day et al. | |
| 6,263,340 B1 | 7/2001 | Green | |
| 6,275,223 B1 | 8/2001 | Hughes | |
| 6,289,460 B1 | 9/2001 | Hajmiragha | |
| 6,317,777 B1 | 11/2001 | Skarbo et al. | |
| 6,334,141 B1 | 12/2001 | Varma et al. | |
| 6,336,134 B1 | 1/2002 | Varma | |
| 6,343,313 B1 | 1/2002 | Salesky et al. | |
| 6,353,817 B1 | 3/2002 | Jacobs et al. | |
| 6,360,236 B1 | 3/2002 | Khan et al. | |
| 6,363,352 B1 | 3/2002 | Dailey et al. | |
| 6,411,989 B1 | 6/2002 | Anupam et al. | |
| 6,502,113 B1 | 12/2002 | Crawford et al. | |
| 6,551,357 B1 | 4/2003 | Madduri | |
| 6,560,637 B1 | 5/2003 | Dunlap et al. | |
| 6,590,584 B1 | 7/2003 | Yamaura et al. | |
| 6,643,663 B1 | 11/2003 | Dabney et al. | |
| 6,687,878 B1 | 2/2004 | Eintracht et al. | |
| 6,708,172 B1 | 3/2004 | Wong et al. | |
| 7,007,232 B1 | 2/2006 | Ross et al. | |
| 7,072,940 B1 | 7/2006 | Day et al. | |
| 7,194,679 B1 | 3/2007 | Green | |
| 7,251,680 B2 | 7/2007 | DeVos | |
| 7,277,901 B2 | 10/2007 | Parker et al. | |
| 7,299,257 B2 | 11/2007 | Boyer et al. | |
| 7,424,543 B2 | 9/2008 | Rice | |
| 7,440,304 B1 | 10/2008 | Raj | |
| 7,478,170 B2 | 1/2009 | Ong et al. | |
| 7,818,660 B2 | 10/2010 | Massand | |
| 7,848,984 B1 | 12/2010 | Robb | |
| 7,890,405 B1 | 2/2011 | Robb | |
| 7,895,276 B2 | 2/2011 | Massand | |
| 7,933,952 B2 | 4/2011 | Parker et al. | |
| 8,136,031 B2 | 3/2012 | Massand | |
| 8,856,640 B1 * | 10/2014 | Barr et al. | G06F 17/20 |
| 8,881,013 B2 | 11/2014 | Lyons et al. | |
| 2001/0034845 A1 | 10/2001 | Brunt et al. | |
| 2001/0037367 A1 | 11/2001 | Iyer | |
| 2001/0037460 A1 | 11/2001 | Porcari | |
| 2002/0049786 A1 | 4/2002 | Bibliowicz et al. | |
| 2002/0059342 A1 | 5/2002 | Gupta et al. | |
| 2002/0059343 A1 | 5/2002 | Kurishima et al. | |
| 2002/0065848 A1 | 5/2002 | Walker et al. | |
| 2002/0078088 A1 | 6/2002 | Kuruoglu et al. | |
| 2002/0085030 A1 | 7/2002 | Ghani | |
| 2002/0091725 A1 | 7/2002 | Skok | |
| 2002/0107886 A1 | 8/2002 | Gentner et al. | |
| 2002/0133628 A1 | 9/2002 | Asplund et al. | |
| 2002/0143691 A1 | 10/2002 | Ramaley et al. | |
| 2002/0184160 A1 | 12/2002 | Tadayon et al. | |
| 2002/0184517 A1 | 12/2002 | Tadayon et al. | |
| 2003/0101163 A1 | 5/2003 | Lui et al. | |
| 2003/0112273 A1 | 6/2003 | Hadfield et al. | |
| 2003/0158855 A1 | 8/2003 | Farnham et al. | |
| 2003/0182450 A1 | 9/2003 | Ong et al. | |
| 2003/0197730 A1 | 10/2003 | Kakuta et al. | |
| 2003/0226116 A1 | 12/2003 | Kuwata et al. | |
| 2004/0034688 A1 | 2/2004 | Dunn | |
| 2004/0085354 A1 | 5/2004 | Massand | |
| 2004/0158799 A1 | 8/2004 | Breuel | |
| 2004/0205653 A1 | 10/2004 | Hadfield et al. | |
| 2005/0010863 A1 | 1/2005 | Zernik | |
| 2005/0010871 A1 * | 1/2005 | Ruthfield et al. | G09G 5/00 |
| 2005/0188307 A1 | 8/2005 | Bailey | |
| 2005/0251738 A1 * | 11/2005 | Hirano et al. | G06F 17/21 |
| 2006/0048224 A1 | 3/2006 | Duncan et al. | |
| 2006/0167686 A1 | 7/2006 | Kahn | |
| 2006/0167879 A1 | 7/2006 | Umeki et al. | |
| 2006/0212362 A1 | 9/2006 | Donsbach et al. | |
| 2006/0253482 A1 | 11/2006 | Zellweger et al. | |
| 2006/0282762 A1 | 12/2006 | Diamond et al. | |
| 2007/0157287 A1 | 7/2007 | Lim | |
| 2007/0186157 A1 | 8/2007 | Walker et al. | |
| 2007/0282660 A1 | 12/2007 | Forth | |
| 2008/0023282 A1 | 1/2008 | Duncan | |
| 2008/0034275 A1 | 2/2008 | Edd et al. | |
| 2008/0034282 A1 | 2/2008 | Zernik | |
| 2008/0065999 A1 | 3/2008 | Majors et al. | |
| 2008/0071781 A1 | 3/2008 | Ninan et al. | |
| 2008/0133673 A1 | 6/2008 | Abdelhadi et al. | |

(56) References Cited

U.S. PATENT DOCUMENTS

| | | |
|---|---|---|
| 2008/0244378 A1 | 10/2008 | Chen et al. |
| 2009/0006936 A1 | 1/2009 | Parker et al. |
| 2009/0012974 A1* | 1/2009 | Cassidy ................. G06F 17/30 |
| 2009/0055416 A1 | 2/2009 | Agarwal et al. |
| 2009/0125518 A1 | 5/2009 | Bailor et al. |
| 2009/0157679 A1 | 6/2009 | Elias et al. |
| 2009/0313331 A1* | 12/2009 | Rasmussen et al. .... G06F 15/16 |
| 2010/0174678 A1 | 7/2010 | Massand |
| 2010/0198864 A1 | 8/2010 | Ravid et al. |
| 2010/0235763 A1 | 9/2010 | Massand |
| 2010/0251104 A1 | 9/2010 | Massand |
| 2011/0004621 A1 | 1/2011 | Kelley |
| 2011/0016387 A1 | 1/2011 | Mundy et al. |
| 2011/0022960 A1 | 1/2011 | Glover |
| 2011/0035421 A1 | 2/2011 | Laird-Mcconnell et al. |
| 2011/0055177 A1 | 3/2011 | Chakra et al. |
| 2011/0137947 A1 | 6/2011 | Dawson et al. |
| 2011/0209159 A1* | 8/2011 | Baratz et al. ............. G06F 9/46 |
| 2011/0252312 A1 | 10/2011 | Lemonik et al. |
| 2011/0264745 A1 | 10/2011 | Ferlitsch |
| 2012/0096342 A1 | 4/2012 | Wang |
| 2012/0101980 A1 | 4/2012 | Taleghani et al. |
| 2012/0109915 A1* | 5/2012 | Kamekawa ............. G06F 17/30 |
| 2012/0110445 A1* | 5/2012 | Greenspan et al. .... G06F 17/24 |
| 2012/0124092 A1 | 5/2012 | Teranishi et al. |
| 2012/0185759 A1* | 7/2012 | Balinsky et al. ....... G06F 17/24 |
| 2012/0192055 A1* | 7/2012 | Antebi et al. ........... G06F 17/00 |
| 2012/0284617 A1 | 11/2012 | Nouard |
| 2012/0284618 A1 | 11/2012 | Bailor et al. |
| 2012/0296790 A1 | 11/2012 | Robb |
| 2013/0031147 A1 | 1/2013 | Ghods et al. |
| 2013/0080545 A1 | 3/2013 | Datta |
| 2013/0111544 A1 | 5/2013 | Balinksy et al. |
| 2013/0218829 A1 | 8/2013 | Martinez |
| 2013/0321083 A1 | 12/2013 | Huang et al. |
| 2014/0033067 A1 | 1/2014 | Pittenger et al. |
| 2014/0033068 A1 | 1/2014 | Gupta et al. |
| 2014/0096186 A1 | 4/2014 | Barton et al. |
| 2014/0237626 A1 | 8/2014 | Marcus et al. |
| 2014/0373108 A1 | 12/2014 | Bailor et al. |
| 2015/0199411 A1* | 7/2015 | Greenspan et al. ........................ G06F 17/30548 |
| 2019/0005011 A9* | 1/2019 | Sitrick et al. ........... G06F 17/24 |

OTHER PUBLICATIONS

Basu et al., "Efficient Virtual Memory for Big Memory Servers," *ACM*, pp. 1-12 (2013).
Complaint in *Litera Corp.* v. *Deneen Marlinez*, No. 14-CVS-6387 (N.C. Sup. Ct., Guilford County, Jun. 9, 2014).
Declaration under 37 C.F.R. § 1.131 and 37 C.F.R. § 1.132 of Deneen Martinez (Jun. 6, 2014).
Goldman, "Role-Based Interfaces for Collaborative Software Development," *ACM*, pp. 23-26 (2011).
Office Action dated Aug. 1, 2013 in U.S. Appl. No. 13/834,483.
Office Action dated Dec. 6, 2013 in U.S. Appl. No. 13/834,483.
Office Action dated Feb. 19, 2015 in U.S. Appl. No. 13/834,483.
Office Action dated Nov. 10, 2015 in U.S. Appl. No. 13/834,483.
Office Action dated Sep. 16, 2016 in U.S. Appl. No. 13/834,483.
Response to Final Office Action and RCE in U.S. Appl. No. 13/834,483 (dated Jun. 6, 2014).
Response to Notice of Non-Compliant Amendment filed Sep. 10, 2015 in U.S. Appl. No. 13/834,483.
Response to Office Action filed Jun. 18, 2015 in U.S. Appl. No. 13/834,483.
Tsai et al., "A document Workspace for Collaboration and Annotation based on XML Technology," Multimedia Software Engineering, 2000. Proceedings. International Symposium on. IEEE, 2000.
Letter re: U.S. Appl. No. 13/423,805 to Litera/ Deepak Massand (3 pages) dated Dec. 2, 2015.
Workshare® Professional 4 SharePoint Release Notes (6 pages).
Workshare® Professional User Guide, p. 13 (3 pages).
Workshare® Professional Version 4 Getting Started Guide (15 pages).
Workshare, Ltd. "Workshare Professional User Guide" 1,2,132,140, 141. Published 2005. London, UK.†
Workshare, Ltd. "Workshare Compare User Guide." 1,2,6,7,8,13,14,15,16,25,26,29,30,34,36,39,43. Published 2010. London, UK.†
Workshare, Ltd. "Workshare Compare Service Developers Guide." 1,2,5,6,10,11,22,25,26,27,29. Published 2007. London, UK.†

* cited by examiner
† cited by third party

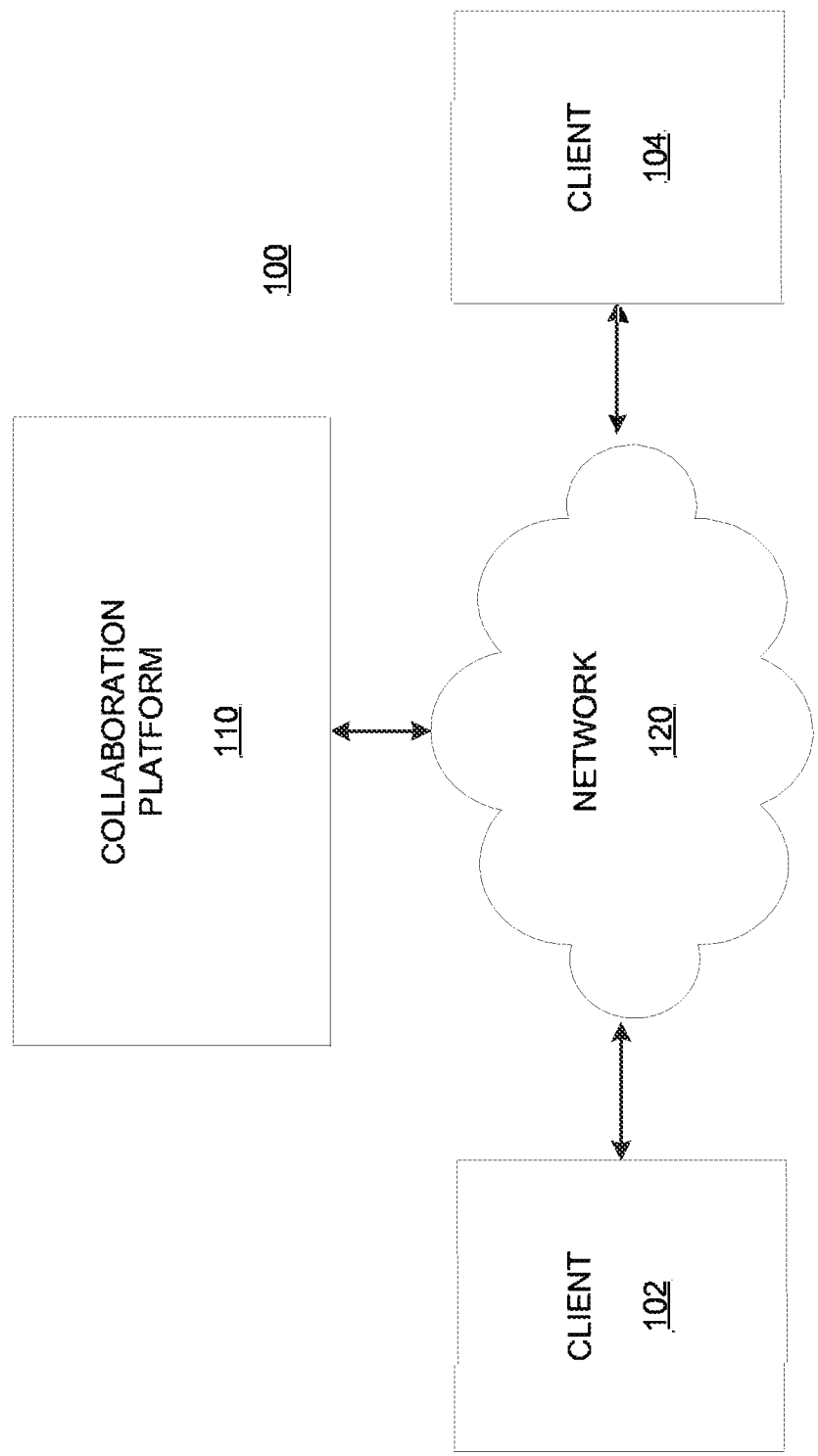

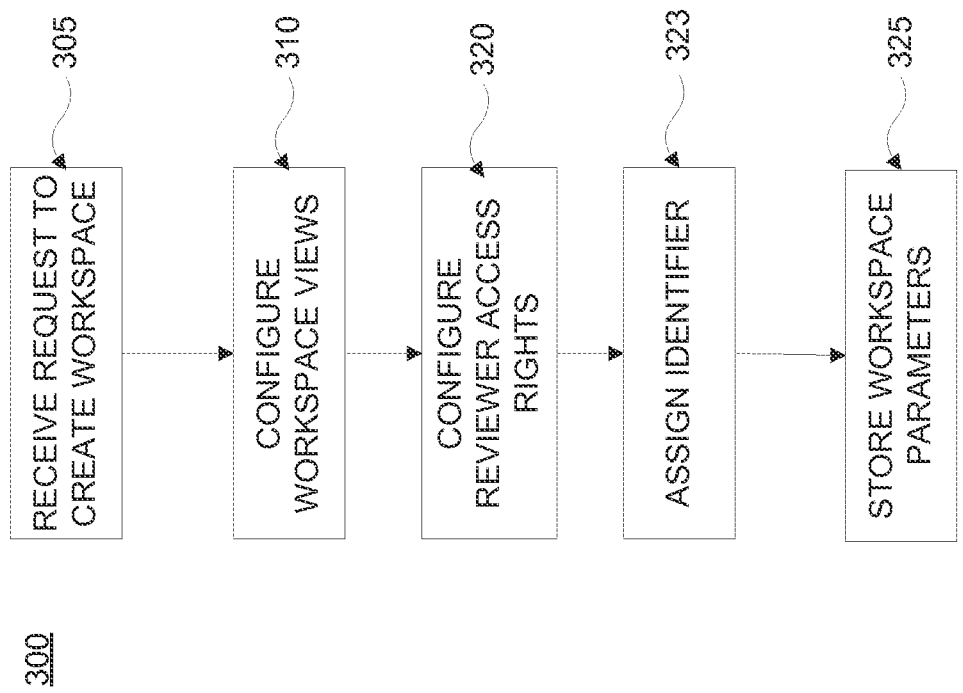

METHODS AND SYSTEMS FOR INTEGRATING MULTIPLE DOCUMENT VERSIONS

This is a continuation of U.S. application Ser. No. 14/843,839, filed Sep. 2, 2015, which is a continuation of U.S. application Ser. No. 13/423,805, filed Mar. 19, 2012, now U.S. Patent No. 9,348,802, all of which are incorporated herein by reference.

FIELD OF THE INVENTION

Embodiments of the present invention generally relate to distributed computing systems and, more particularly, relate to systems, methods, and articles of manufacture for collaborating information over a computer network.

BACKGROUND OF THE INVENTION

The ubiquity and versatility of the Internet continues to spur the development of information management applications. Software products such as HyperOffice, Dropbox, BOX, and OpenText Tempo™ provide users with the ability to save and share documents in a Web (cloud) based storage container where they and other invited users can access these documents. In such products, a user may select and save a copy of a document from storage locations on their local computer or network or Document Management System (DMS) to a container located on the Web, where they can later access it from any device over the Internet or share it with others.

While such products provide remote access to documents, and consumer lever users find this functionality useful, they do not provide enough versatility and security needed for business professionals sharing information on the Internet. Security, risk and compliance professionals shy away from "documents in the cloud". For example, conventional systems do not allow for the option for a document owner to send to a reviewer only a link to a document that allows a reviewer limited access to the document during a session with the Web--based service. Nor do such systems prevent the reviewer from maintaining a copy of the document after the session ends. Such systems further do not offer options for collaborating on project folders that offer reviewer-specific access to documents in the folders.

Accordingly, there is a need for a method and system that provides collaboration between information owners and reviewers while enabling owners to maintain control over original documents.

SUMMARY OF THE INVENTION

The disclosed embodiments provide, among other things, improved systems and methods of collaborating information over a computer network.

In one embodiment, a system is disclosed for collaborating information Over a network. The system may include a storage device and one or more processors. The one or more processors may maintain a document in the storage device, the document being a copy of an original document created by an owner and stored in a data storage separate from the storage device. The one or more processors may also publish content links to the document in a workspace that is configured by the owner with access rights for a first reviewer. The one or more processors may additionally provide content of the document to a collaboration platform in response to a selection by the first reviewer of the content link in the workspace that is rendered by the collaboration platform to the first reviewer. The one or more processors may also receive, from the collaboration platform, adjustments to the content made by the first reviewer through the collaboration platform during a communication session with the collaboration platform, with the collaboration platform temporarily storing the document in a virtual memory for rendering the document to the first reviewer during the collaboration session between the first reviewer and the collaboration platform, and with the collaboration platform also deleting the content from virtual memory in response to the first reviewer ending the communication session with the collaboration platform. The one or more processors may further synchronize the adjustments to the document with the data storage through a collaboration document created by the data storage that maintains the adjustments to the document made by the first reviewer such that the original document remains unadjusted. In addition, the one or more processors may also create and maintain a second version of the document that includes the adjustments by the first reviewer and re-publish the content link to the document in the workspace such that the content link links to the second version of the document, bi-directionally synchronizing the content between the data storage and the content links in the workspace rendered by the collaboration platform.

In another embodiment, a system is disclosed for collaborating information over a network that may include a data storage storing an original document created by an owner, an application executed by a processor, and an agent server. The application may be configured to provide a process for the owner to create a workspace and create a notification relating to the workspace relating to the workspace. The agent server may be configured to create a second document that is a copy of the original document, assign access rights to the second document for the one or more reviewers, and publish a content link to the second document in the workspace. The agent server may also provide content of the second document to a collaboration platform in response to a selection, by the one or more reviewers, of the content link in the workspace that is rendered by the collaboration platform to the one or more reviewers during respective communication sessions between the one or more reviewers and the collaboration platform. The agent server may additionally receive from the collaboration platform information reflecting a change, annotation, and/or comment to the second document made by the one or more reviewers through the collaboration platform during the respective communication sessions with the collaboration platform, with the collaboration platform deleting the second document from a virtual memory that is used for rendering the second document to the one or more reviewers in response to the one or more reviewers ending the respective communication sessions with the collaboration platform. The agent server may also synchronize the change, annotation, and/or comment to the second document with the original document stored in the data storage.

In another embodiment, a system is disclosed for collaborating information over a network that may include a virtual memory and one or more processors that may be configured to receive a workspace from an owner, where the workspace includes a content link to a document created by the owner. The one or more processors may also receive a request from a first reviewer to access the workspace and receive a selection of the content link from the first reviewer during a communication session with the first reviewer over a network. The one or more processors may also retrieve, based on the selection, content for the document from the owner, store the document content in the virtual memory, and render the content from the document such that the first reviewer is able to access and make changes to the document over the network based on access rights to the document set by the owner. Additionally, the one Or more processors may receive input to the content from the reviewer corresponding to changes, annotations, and/or comments to the document and provide the changes, annotations, and/or comments to the owner such that the owner synchronizes the changes, annotations, and/or comments through a collaboration document that is separate from an original version of the document stored at a data storage. Further, the one or more processors may delete the document content from the virtual memory when the communication session with the first reviewer ends.

In another embodiment, a system is disclosed for collaborating information between an owner of a workspace and reviewers that may include a virtual memory and one or more processors that may be configured to generate, for each reviewer, a customized view of the workspace based on access rights set by the owner for each respective reviewer. The one or more processors may also generate a content link to a document in the workspace that, when selected by a respective reviewer, retrieves content relating to the document from an agent server of the owner and temporarily renders the document to the reviewers using the virtual memory that prevents the reviewers from retrieving a copy of the document. The one or more processors may further be configured to send to the agent server information relating to transactions performed on the document by authorized reviewers having access rights to perform the transactions, and delete the document from the virtual memory after the transactions have been synchronized with an original version of the document created by the owner.

In another embodiment, a process is disclosed for collaborating information over a network. The process may include maintaining a document in a storage device, with the document being a copy of an original document created by an owner and stored in a data storage separate from the storage device. The process may also include publishing a link to the document in a workspace that is configured by the owner with access rights for a first reviewer and providing content of the document to a collaboration platform in response to a selection, by the first reviewer, of the content link in the workspace that is rendered by the collaboration platform to the first reviewer. The process may further include receiving from the collaboration platform one or more changes to the document made by the first reviewer through the collaboration platform during a communication session, with the collaboration platform temporarily storing the document content in a virtual memory for rendering the document to the first reviewer during the communication session with the collaboration platform, and the collaboration platform deleting the document content from the virtual memory in response to the first reviewer ending the communication session with the collaboration platform. The process may additionally include synchronizing one or more changes to the document with the data storage through a collaboration document created by the data storage that maintains the one or more changes to the document made by the first reviewer, with the original document remaining unchanged.

In another embodiment, a process is disclosed for collaborating information over a network. The process may include receiving a workspace from an owner, with the workspace including a content link to a document created by the owner. The process may also include receiving a request from a first reviewer to access the workspace, receiving a selection of the content link from the first reviewer during a communication session with the first reviewer over a network, and retrieving, based on the selection, content for the document from the owner. The process may also include storing the document content in a virtual memory and rendering the content from the document such that the first reviewer is able to access and make changes to the document over the network based on access rights to the document set by the owner. The process may further include receiving input to the content from the reviewer corresponding to changes, annotations, and/or comments to the document and providing the changes, annotations, and/or comments to the owner such that the owner synchronizes the changes, annotations, and/or comments to the document through a collaboration document that is separate from an original version of the document stored at a data storage. The process may additionally include deleting the document content from the virtual memory when the communication session with the first reviewer ends.

In another embodiment, a process is disclosed for collaborating information over a network. The process may include creating a workspace, sending a notification relating to the workspace to one or more reviewers, creating a second document that is a copy of an original document stored in a data storage, and assigning access rights to the second document for one or more reviewers. The process may also include publishing a content link to the second document in the workspace and providing content of the second document to a collaboration platform in response to a selection by one or more reviewers of the content link in the workspace that is rendered by the collaboration platform to one or more reviewers during respective communication sessions between the one or more reviewers and the collaboration platform. Additionally, the process may include receiving information from the collaboration platform reflecting changes, annotations, and/or comments to the second document made by one or more reviewers through the collaboration platform during the respective communication sessions, with the collaboration platform deleting, in response to the one or more reviewers ending the respective communication sessions with the collaboration platform, the second document from a virtual memory that is used for rendering the second document to the one or more reviewers. The process may further include synchronizing the changes, annotations, and/or comments to the second document with the original document stored in the data storage.

In another embodiment, a system is disclosed for collaborating information over a network that may include a storage device and one or more processors. The one or more processors may bi-directionally synchronize content included in an original document created by an owner and the document's content rendered on a workspace provided by a collaboration platform using a copy of the original document that is stored in the storage device, with the workspace being accessible by one or more reviewers over a network. The one or more processors may also synchronize each reviewer's adjustments made to the document's content in the workspace with the content in the original document such that each reviewer can view the adjustments to the document's content made by other reviewers through the workspace during respective communication sessions with the collaboration platform.

Additional objects and advantages of the disclosed embodiments will be set forth in part in the description which follows, and in part will be obvious from the description, or may be learned by practice of the disclosed embodiments. The objects and advantages of the disclosed embodiments will be realized and can be attained by the elements and combinations particularly pointed out in the appended claims.

It is to be understood that both the foregoing general description and the following detailed description are exemplary and explanatory only and are not restrictive of the disclosed and/or claimed embodiments. Further features and/or variations may be provided in addition to those set forth herein. For example, the disclosed embodiments may be directed to various combinations and subcombinations of the disclosed features and/or combinations and subcombinations of several further features disclosed below in the detailed description.

BRIEF DESCRIPTION OF THE DRAWINGS

The accompanying drawings, which are incorporated in and constitute a part of this specification, illustrate various embodiments and aspects of the present invention. In the drawings:

FIG. 1 illustrates an exemplary system environment for implementing certain embodiments;

FIG. 3 is a flowchart illustrating an exemplary workspace creation process consistent with certain disclosed embodiments;

DESCRIPTION OF THE EMBODIMENTS

Figure 1A:
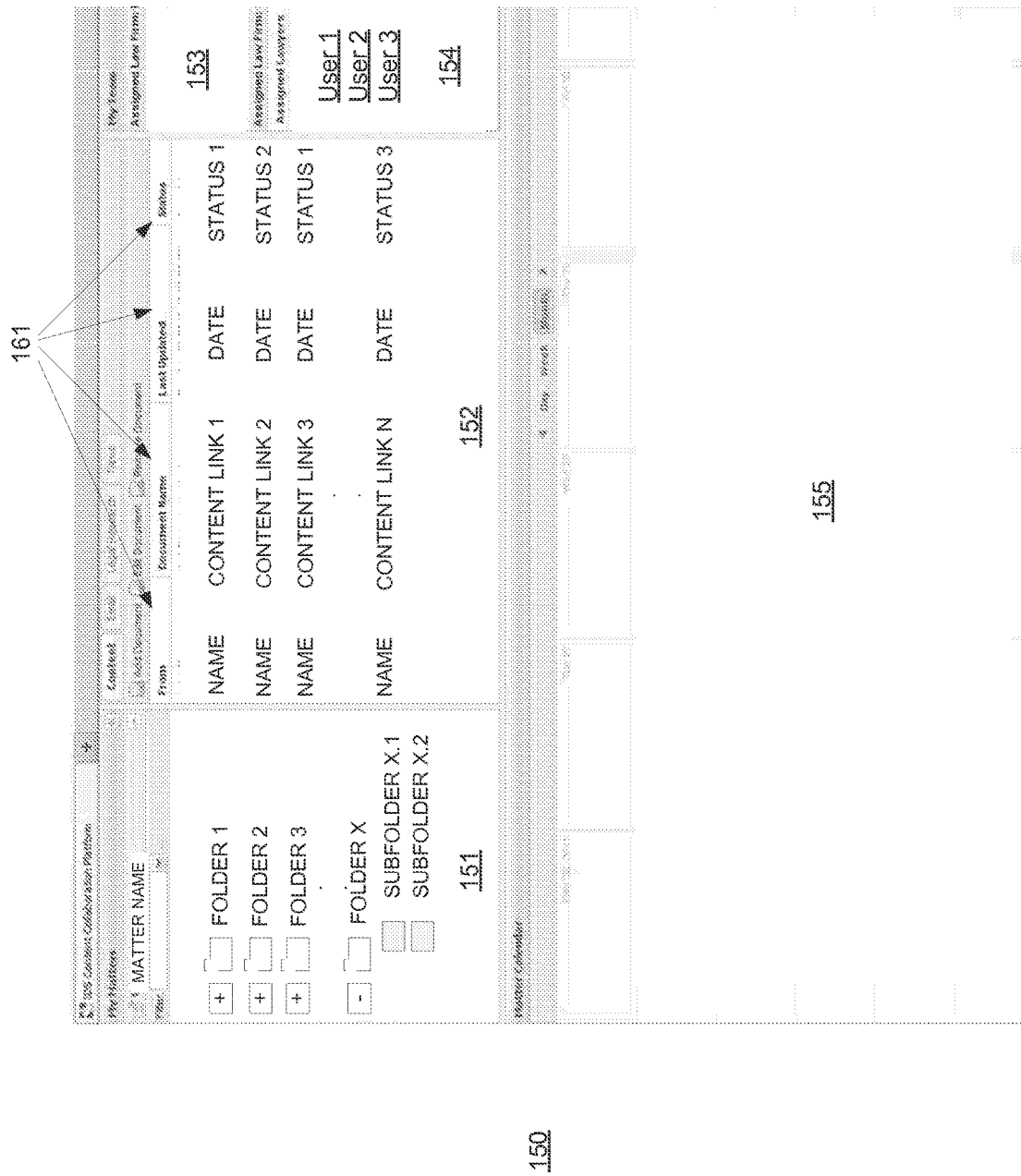
FIG. 1A illustrates an exemplary workspace for implementing certain embodiments.

Reference will now be made in detail to the exemplary embodiments of the invention, examples of which are illustrated in the accompanying drawings. Wherever possible, the same reference numbers will be used throughout the drawings to refer to the same or like parts.

FIG. 1 illustrates an exemplary system environment 100 consistent with certain disclosed embodiments. In one example, system 100 provides a collaboration environment where client systems 102, 104 are connected to a network 120 and can share and make changes to, comment on, and annotate information via a collaboration platform 110. In certain embodiments, system 100 enables a user to share information by, for example, synchronizing documents created by one or more clients 102, 104 with collaboration platform 110 and providing access to those documents via collaboration platform 110 through links to the documents in accordance with certain embodiments of the present invention.

Client 102,104 may be a computer system including one or more computing components for performing one or more processes consistent with certain aspects of the disclosed embodiments. In one embodiment, client 102, 104 may include one or more computer or data processing devices that have hardware (e.g., one or more processors, storage memory, data buses, network interface, etc.), software (e.g., web browsers, application programs, operating systems, other executable program code written in any known programming language such as PL/SQL, AJAX, XML, JavaScript™, C, C++, Java™, etc.), and/or firmware (e.g., software embedded in a hardware device). Client 102, 104 may be configured to communicate with one or more networks, such as network 120, and with other clients or servers connected to network 120 or other computers or components connected to a local network (not shown). One or more users may operate one or more components of client 102, 104 to perform one or more processes consistent with the disclosed embodiments. Also, client 102, 104 may be associated with an entity, such as a company, organization, government agency, educational or medical facility, firm, or any other type of business or non-business entity. In certain embodiments, client 102 may be associated with an entity that is different from that associated with client 104. Alternatively, client 102 and client 104 may be associated with the same entity. Further, client 102 may be associated with a department, division, etc. of an entity that is different from a department, division, etc. of the same entity associated with client 104. Moreover, client 102, 104 may execute software processes stored on tangible and non-transitory computer-readable mediums that perform one or more processes consistent with the disclosed embodiments. While FIG. 1 illustrates two clients 102,104, aspects of the disclosed embodiments are not limited to such a configuration. Thus, the disclosed embodiments may be implemented with any number of clients interconnected by network 120. Further, the term "client" used herein to describe client 102, 104 is not intended to be limiting to a client in the sense of known client-server configurations, although such configurations may be implemented by the disclosed embodiments. For example, client 102, 104, may be (or include) a server type computer system or server software that may also request and receive information, data, services, processes, etc. from another computer system in a local and/or remote network.

In one embodiment, client 102, 104 may create, maintain, edit, modify, copy, send, receive, store, delete, and the like, one or more documents. In one non-limiting example, a document may be a file, email, calendar, articles, or other content or information that software, processors, and/or users may use. For example, a document may be a word processing document containing content (e.g., text, graphics, links, etc.). A document may also be a spreadsheet file, a web page, a PDF file, or any other type of file that includes content that may be viewed, edited, modified, copied, shared, etc. by a user, processor, or software. A document may be included in a folder containing multiple documents. For example, disclosed embodiments may work with one or more folders containing one or more documents, such as multiple word processing files, spreadsheets, tables, graphical files, etc. A folder may also include one or more subfolders, each containing one or more documents. The above-listed examples of documents and folders are not intended to be limiting to the disclosed embodiments.

In one embodiment, client 102, 104 and their respective user(s) (or entity associated with client 102, 104) may be an owner or a reviewer. For example, an owner may be a user or client that creates, maintains, controls, or otherwise is an owner of a document or a folder that contains multiple documents or subfolders. An owner may share one or more documents or the entire folder through collaboration platform 110 in accordance with certain disclosed embodiments. An owner may also edit, modify, delete, and copy a document that is owned by the owner. For example, an owner may create a word processing document using client 102, 104 and have access rights to view, modify, and otherwise alter the contents of that document in accordance with the disclosed embodiments. Aspects of the disclosed embodiments may also allow another user to have owner rights to that document. A client, such as client 102, may be used by one or more owner users to create, modify, copy, delete, and/or share one or more documents, and thus may also be an owner. A reviewer may be a user or client that accesses, reviews, analyzes, modifies, comments on, annotates, edits, or otherwise works with a document shared by an owner in accordance with certain disclosed embodiments. For example, client 102 (and/or a user of client 102) may be an owner and client 104 (and/or a user of client 104) may be a reviewer of documents and/or folders shared by client 102. Further, client 102 may be a reviewer of documents and/or folders shared by client 104. Other clients (not shown) may also be implemented that each may be owners, reviewers, or both, respective to other clients.

In certain embodiments, an owner of a document may be a reviewer of another document and/or folder, and the reviewer of a document and/or folder may be the owner of another document and/or folder. For example, client 102 may be an owner of a word processing document created by a user associated with client 102 that is configured to share that document with client 104 through collaboration platform 110.- In this example, client 104 may be a reviewer of the word processing document shared by client 102. Client 104 may also be an owner of a spreadsheet document that is shared with client 102 through collaboration platform 110. In this example, client 102 is an owner of the word processing document and a reviewer of the spreadsheet document, while client 104 is an owner of the spreadsheet document and a reviewer of the word processing document.

In certain embodiments, any number of clients (and users) may share documents using collaboration platform 110. Thus, owners and reviewers may be individuals or groups of individuals with access to the collaboration platform 110 using client 102, 104. A document may have one or more owners, and may be accessible by one or more reviewers depending on various determined user authorizations and access rights. Certain embodiments enable an owner to establish access rights that will allow viewing, annotating, or editing of the documents by one or more reviewers. Further, embodiments enable an owner to prevent one or more reviewers to retain copies of the owner's document, enabling the owner to retain complete control over their document. In other embodiments, owners may grant varying levels of access rights to reviewers, such that certain reviewers may alter or gain control over certain shared documents or underlying information, files, content etc. in a document.

Referring back to FIG. 1, network 120 may be any type of communication network configured to communicate information in system 100. Network 120 may be a wireless and/or wireline network including one or more components (e.g., hardware, software, and/or firmware) configured to receive, route, translate, and deliver information. For example, network 120 may be the Internet, an Extranet, an Intranet, a Local Area Network, Wide Area Network, etc. that enables clients (or other computer systems) to communicate and collaborate in accordance with aspects of the disclosed embodiments. Network 120 may include infrastructure that implements the communication and collaboration of information over these types of networks, such as routers, bridges, servers, wireless/wireline base stations, transceivers, and related technology. In certain embodiments, network 120 may be separate networks that connect client 102 to collaboration platform 110 and that connect client 104 to collaboration platform 110. For example, network 120 may include a local area network, wide area network, portions of the Internet etc. that provide connections between client 102 and collaboration 110 that is different (in whole or in part) to a local area network, wide area network, portions of the Internet etc. that provides connections between client 104 and collaboration 110.

Collaboration platform 110 may be a system that provides collaboration and other types of information sharing processes consistent with the disclosed embodiments. In one example, collaboration platform 110 may be a web-based computing system that interconnects with one or more clients, such as clients 102, 104, over the Internet. In one example, collaboration platform 110 may include one or more servers and memory storage devices. For instance, collaboration platform 110 may include one or more computer or data processing devices that have hardware (e.g., one or more processors, storage memory, data buses, network interface, etc.), software (e.g., web browsers, web servers, application programs, operating systems, other executable program code written in any known programming language such as PL/SQL, AJAX, XML, JavaScript™, etc.), and/or firmware (e.g., software embedded in a hardware device). Collaboration platform 110 may also include one or more memory devices, such as local or networked memory storage media, shared memory platforms, or a combination thereof. In certain embodiments, collaboration platform 110 includes memory that stores documents, folders of documents, information, content, data, etc. for transmission and viewing by clients 102, 104 through browser or similar type of software. In accordance with disclosed embodiments, collaboration platform 110 temporarily provides access to such information in a virtual memory during communication sessions with a client (e.g., client 102, 104), and deletes the information from its virtual memory at the end of a communication session with the client.

Virtual memory may be a physical memory that is configured to temporarily store content (e.g., documents, folders, information, etc.) that is used by collaboration platform to provide the content to reviewers via browser software executed at the reviewer client computer. Collaboration platform 110 may be configured to delete the content when a communication session ends with the reviewer computer such that the reviewer computer does not retain copies of the content (including a document) in temporary cache memory of the reviewer client computer's browser. Thus, unlike typical web servers that may load content into a temporary memory on the server that is accessible by users after a communication session ends with the users, collaboration platform 110 may use a virtual memory dedicated to store content and information associated with an owner's document and/or folder that is deleted after communication sessions end with users accessing that content and information.

Collaboration platform 110 may be configured to execute software that performs processes consistent with the disclosed embodiments. For example, collaboration platform 110 may perform security processes that control access to documents, folders of documents, or any other information that may be temporarily displayed and processed by collaboration platform during a communication session with one or more clients 102, 104. Collaboration platform 110 may also perform collaboration processes that enable clients 102, 104 (or their users) to share and collaborate on documents, folders of documents, content, or other information over network 120. Collaboration platform 110 may also perform processes that enable users or clients to communicate via, for example, email or instant messaging. In certain disclosed embodiments, collaboration platform 110 may also provide application specific operations, such as content viewer, editor, collaboration, sidebar, approval, compare, clean metadata, PDF-creating, reporting, and/or administrative applications, calendar, and security functions. Collaboration platform 110 may also execute software that allows multiple clients or their users to simultaneously log-in and interact through hosted communication applications, such as instant messaging or other real-time communications functions. Collaboration platform 110 may also provide message boards, private messaging, wall postings, email, and various other methods of electronic communication known in the art.

In certain embodiments, collaboration platform 110 performs processes that may display content links to shared content, including data, documents, folders, and other information through a workspace. In one example, a workspace may be a virtual environment hosted by collaboration platform 110 that facilitates collaboration and sharing among owners and reviewers. A workspace may be customized by users of clients 102, 104 to display customized information over network 120 during communication sessions between collaboration platform 110 and clients 102, 104. Workspaces may be created by a client (e.g., client 102, 104) via user input. In one embodiment, a user who creates a workspace may configure user authorizations and access rights to permit owners to share documents, folders, content, etc. and to permit reviewers to access and possibly edit that information on the workspace. Collaboration platform 110 may be configured to render content links within a workspace that, when selected by a client owner or reviewer (102, 104), retrieve content and information associated with documents and folders from a client owner for rendering the requested content and information in a viewer, editor, or a web-based tool that enables users to view and possibly edit, annotate, or otherwise change information in the content. A workspace may further enable owners to configure user authorizations and access rights for each content link, enabling owners to exercise control over their documents, folders, or content. In accordance with certain disclosed embodiments, owners may publish links to content on the workspace through, for example, a content sharing process described below.

In certain embodiments, a workspace may be configured to include areas that are designated for certain features and for owners or reviewers. In one example, a workspace may include display tabs, menus, dashboard elements, and/or graphical displays for providing email, calendar, news, history, reporting, activity logs, instant messaging, message boards, links to other workspaces, and analytics such as expenses and billing for rendering information relating to specific tasks, matters, projects, or features. In further embodiments, a workspace may also include custom tabs, menus, elements, dashboards, and/or graphical displays created and configured by a user (or client) that created the workspace, or by other authorized users (or clients) with access rights to configure the workspace.

Owners may create their own workspaces and reviewers may, if authorized, add documents, content, etc. to be included in an owner's workspace. Workspace views may be customized and dictated by user access rights, such that documents, folders, content, and browser menu options will or will not be available in accordance with user access rights, such as blocking save as or print options if specific rights have not been granted. In one embodiment, for example, a user may initiate a request at client 102 to create a new workspace. Client 102 may perform processes that enable the user to configure owner/reviewer rights to the workspace, select documents, folders, content etc. that are to be included in the workspace, and set authorizations and access rights for some or all of the documents, folders, and content associated with the workspace. The user may therefore authorize only certain users—owners and reviewers—to access the new workspace, and may grant different levels of access to the links to documents, folders, and content included in the workspace among the authorized users. For example, a user may authorize certain reviewers to have access to review—but not edit—selected documents, while permitting other reviewers to both review and edit those same documents. In a further embodiment, an owner may permit certain reviewers only temporary access to review and/or edit shared content provided by collaboration platform 110, but permit other reviewers to retain and save copies of the shared content. Through various disclosed embodiments, owners may grant reviewer authorizations and varying levels of access in order to, for example, retain control over their shared content, or to permit certain reviewers to alter that content, or to permit certain reviewers to retain and save copies of that content. In another embodiment, collaboration platform 110 may be configured to perform access control rules that adhere to Country data privacy restrictions that prevent access to any information outside of restricted Countries.

FIG. 1A illustrates an exemplary workspace 150 that collaboration platform may provide in accordance with certain disclosed embodiments. Workspace 150 may be a workspace that an owner has configured specific access rights to information for a reviewer to access, view, and possibly annotate and/or edit. Exemplary workspace 150 may include a folders area 151 that lists folders of documents that the reviewer is authorized to view and access. Workspace 150 may also include a document list area 152 that lists one or more content links (e.g., content links 1 to N) to accessible documents included in a selected folder from the folders area 151. A reviewer may access a particular document by selecting an appropriate link listed in the document list area 152 of workspace 150. In one example, document list area 152 may include fields 161 that present characteristics of each document affiliated with a content link. For instance, FIG. 1A shows a "From" field that may identify the owner of a document relating to each content link. The "Document Name" field may include the content link including a name of the document. The "Last Updated" field may represent when the underlying document of each content link was last updated through collaboration platform 110. The "Status" field may represent the current status of the underlying document for each content link. For example, a document may be in an unreviewed status, meaning the document has not been reviewed, an under review status, meaning the document is being reviewed, or a review complete status, meaning the document review is complete.

Other status identifiers and other fields 161 may be implemented without departing from the scope of the disclosed embodiments.

Workspace 150 may further include a document list area for approved or final versions of documents that provide links to access documents but provide no editing or altering functionalities for those documents. Workspace 150 may also include an area 155 that provides other information, such as a calendar that provides a calendar view of items related to a particular matter that the reviewer has been authorized to view or edit.

Workspace 150 may also include an assigned entity area 153 that includes information relating to the entity that is assigned rights to workspace 150. Workspace 150 may also include an assigned users area 154 that includes names or identifiers of one or more users assigned certain rights to workspace 150.

Thus, in certain embodiments, a workspace may be an information configuration that includes content links to documents and folders. Access to the documents and folders of workspace may be customized such that when rendered by collaboration platform 110, the workspace may present only information and content (e.g., content links to folders and documents, tabs, elements, etc.) that are authorized for access by assigned users. For example, a workspace may be configured to include Folder 1 and Folder 2 (shown in FIG. 1A) and Content Links 1-3 (shown in FIG. 1A) for user 1 and user 2 (shown in FIG. 1A). Collaboration platform 110 may be configured via aspects of the disclosed embodiments to render the same workspace but with different content links for user 3 (shown in FIG. 1A).

Other areas, information, tabs, elements, dashboards, etc. may be included in a workspace, and the example shown in FIG. 1A is not intended to be limiting to the disclosed embodiments. For example, in a workspace generated for collaboration between a corporate client and law firm, workspace views may contain the following elements: a Corporation Matter/Project Folder Listing, Content Tab, Approved Content Tab, Email Tab, Legal Research Tab, News Tab. Team Contact Information, Attorney Profile Information, Matter/Project/Content Calendar, History and Reporting, Budgets, Expenses, etc. The Corporation Matter/Project Folder Listing may display Matter Name and default sub-folders (e.g., General, Correspondence, Legal Hold). The Content Tab may display listing of hyperlinks to content shared by content owners and reviewers. The Approved Content Tab may also display listings of hyperlinks to final and/or approved versions of documents and other content. Consistent with certain disclosed embodiments, a workspace may provide an approval functionality that, as one example, may enable users to publish links or send notification emails to other users requesting approval, rejection, comments, or other feedback on a proposed final version of a document, and generate a link to a final version under the Approved Content Tab if the other users approve it. The Email Tab may display a listing of hyperlinks to email threads initiated by content owner(s) and/or reviewer(s). The Legal Research Tab may display hyperlinks to legal research provided by content owner(s). The News Tab may display hyperlinks to news articles provided by content owner(s). The Team Contact Information may display hyperlinks to both law firm attorneys) and Corporate inside counsel assigned to a matter/project. Clicking on provided hyperlinks may display attorney profile information. The Matter/Project/Content Calendar may provide information in calendar format that may be used to keep track of deliverables and due dates. The History Tab may display connection history and hours worked on content for each team member. In one embodiment, this tab may only be visible to the workspace creator. The Reporting Tab may display history of changes for given content, documents, etc. This tab may also be configured to only be visible to the workspace creator. The workspace 150, in certain embodiments, may further provide capabilities such as binder or report functions that may assist a client 102, 104 in creating collections of various information and linked content on the workspace 150. Consistent with various embodiments of the disclosed invention, workspace 150 may be a unified workspace providing comprehensive collaboration functionalities, including document-sharing, communication, scheduling, etc., between various users and entities in a variety of contexts.

Figure 2:
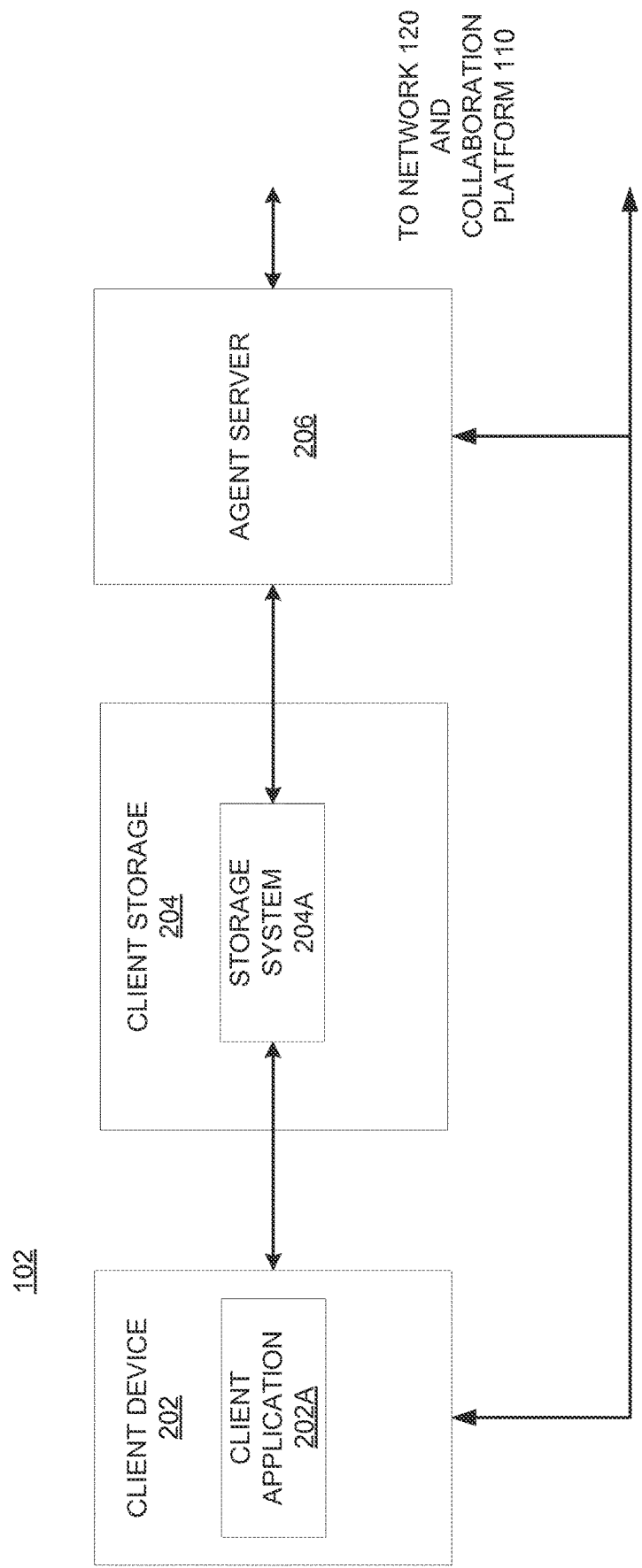
FIG. 2 illustrates an exemplary client system implementing certain embodiments.

FIG. 2 shows components of an exemplary client 102 consistent with the disclosed embodiments. The illustration, descriptions, functionalities, and operations disclosed in connection with client 102 are also applicable to client 104 (or other clients that may be implemented in system 100). As shown, client 102 may include one or more client devices 202, one or more client storages 204, and one or more agent severs 206, Client device 202 may be one or more computer systems configured to execute software, create, edit, modify, manage, etc. documents, and send and receive documents. For example, client device 202 may be a desktop PC, a laptop, a PDA, a workstation, tablet, cell phone device, smart phone device, or any other processor, computer, or device (or group thereof) configured to locally or remotely execute software, send and receive information over a network, such as the internet, and perform data processing operations. In one embodiment, client device 202 may include one or more computer or data processing devices that have hardware (e.g., one or more processors, storage memory, data buses, network interface, etc.), software (e.g., web browsers, application programs, operating systems, other executable program code written in any known programming language such as PL/SQL, AJAX, XML, JavaScript™, etc.), and/or firmware (e.g., software embedded in a hardware device).

One or more users may operate client device 202 to perform functions consistent with certain embodiments of the disclosed invention. In certain embodiments, client 202 may execute software that performs processes that access one or more client storage 204 and agent server 206, and may also access collaboration platform 110 through a secured layer, such as a firewall (not shown). In one embodiment, client device may include one or more client applications 202A, which may be software applications that work with documents, data, content or other types of information. For example, client application 202A may include a word processing application, such as Microsoft Word™, a spreadsheet application, a document management system (DMS) client application, an email application (e.g., Microsoft Outlook™), and/or a document collaboration application, such as Google Docs, Zoho, or a Litera IDS client. Client device 202 may include one or more client applications 202A that provide different types of features, such as email, document creation and editing, document comparison, PDF processes such as printing, extraction, redaction, Bates numbering, binding or editing, web-page related applications, graphical drawing applications, financial service applications, etc., without departing from the features of the disclosed embodiments. In one embodiment, through client application 202A, client 202 may host and provide one or more of the following services and capabilities: access rights selection, content viewer, content editor, collaboration, sidebar, content approval process, content compare and/or redline, calendar, email, reporting, and administration.

In one embodiment, client application 202A may include the functionality to create workspaces and invite reviewers to access documents or folders in a workspace. For example, aspects of the disclosed embodiments enable a word processing application to include a "create workspace" option such as a command that a user may select to create a workspace rendered by collaboration platform 110 during a collaboration session. The word processing application may also include ribbons or hot-key combination logic that enables a user to initiate an invite to one or more reviewers to access and review a document created or changed using the word processing application.

Client storage 204 may be one or more local or network memory storage media, or internal and/or external network-based document or data management systems. For example, client storage 204 may include one or more storage systems 204A that include one or more computer systems (e.g., database servers) and one or more tangible non-transitory storage media, such as one or more databases, hard drives or other types of storage devices. Storage system 204A may include, for example, a document management system (DMS), such as SharePoint®, Desksite®, Autonomy iManage, OpenText Tempo™, World Dox®, NetDocuments®, DropBox, Box.net or network storage. Client storage 204 may be configured to execute one or more processes consistent with certain disclosed embodiments. In certain embodiments, storage system 204A may store original documents created by an owner user using client application 202A executed by client device 202. Storage system 204A may also store versions of original documents that may include changes made by the owner or one or more reviewers through collaboration platform 110. In certain embodiments, client storage 204 may provide access to documents and folders of documents through client device 202 and/or agent server 206 to select data, documents, folders of data or documents, or other content to share over collaboration platform 110.

In certain embodiments, client storage 204 may store original documents created by owners and corresponding collaboration files that are document versions for any changes to an original document. In one embodiment, the collaboration files are stored in a format that is different from the format of the original document. As one example, an original document may be created as a Microsoft Word™ document (e.g., .docx file format), but the collaboration file for that original document may be stored as a Liters IDS file (e.g., .ids file format) based on changes made using IDS editing tools during a collaboration session. Client storage 204 may execute a stub-holder that pulls in an original document from storage and compares all collaborative changes captured during a collaboration session. Client storage 204 may also store an edit history table and a version control table that maintain historical information reflecting edits made to a particular document and the versions of the document created based on those documents.

Agent server 206 may include one or more computers configured to execute software that performs one or more processes consistent with the disclosed embodiments. Agent server 206 may be configured to perform synchronization functions with collaboration platform 110 and client storage 204 to maintain up to date versions of original documents, folders, and other content provided in workspaces. In certain embodiments, agent server 206 may be configured to function as a transitional content repository as an intermediary between client 102, 104 and collaboration platform 110. In further embodiments, agent server 206 may be configured to function as an interface to access collaboration platform 110. Thus, in certain embodiments, software, algorithms, web rendering logic, data, etc. used to provide applications may reside in the collaboration platform 110, and not with agent server 206. Agent server 206 may be configured to receive requests related to applications, for example, from client device 202. Agent server 206 may also be configured to deliver requests to collaboration platform 110, and to receive application or application-related information from collaboration platform 110.

Although FIG. 2 shows client device 202, client storage 204, and agent server 206 as separate components, the disclosed embodiments may implement single computer systems that operate as a client device 202, client storage 204, and agent server 206, or any combination thereof.

In one embodiment, agent server 206 may include one or more computer or data processing devices that have hardware (e.g., one or more processors, storage memory, data buses, network interface, etc.), software (e.g., web browsers, application programs, operating systems, other executable program code written in any known programming language such as PL/SQL, AJAX, XML, JavaScript™, etc.), and/or firmware (e.g., software embedded in a hardware device) that provide information to, and receive information from, collaboration platform 110. Agent server 206 may include one or more databases that maintain information and tables for managing and performing collaboration functions consistent with the disclosed embodiments. For example, agent server 206 may include an edit history table or activity log that maintains date and timestamp information relating to a transaction associated with the creation or update of an original document stored in client storage 204. The edit history table in the agent server may also include an identifier (e.g., userid) of the client or user that initiated the transaction (e.g., create or edit). Agent server 206 may also store=entries in its edit history table to log an invitation generated by agent server 206 to notify one or more reviewers of a transaction (e.g., document creation or edit). The invitation log data may include a date and timestamp of the transaction, and the identifier of the user or client that initiated the transaction. Agent server 206 may also create and maintain an invitation table or log that stores an activity record of the email address (or similar contact information, such as IP address, etc.) for each recipient of the invitation that may be associated with the invitation (e.g., email) record maintained in the edit history table. Alternatively or in tandem, collaboration platform 110 may also generate and store entries in an edit history table or activity log whenever a transaction occurs with a document or a content link.

Agent server 206 may maintain copies of documents and all collaborative changes as separate data objects for document management and version control. The edit history and version controls may be bi-directionally synchronized with the original document maintained by client storage 204 and the content links published or re-published on the workspace 150. In certain embodiments, agent server 206 executes software that provides the functional logic to control: (1) database operations, including creation of user accounts, unique identifiers, global unique identifiers for workspaces, activity logs and connection history; (2) content flow and distribution; (3) connection access and communication with collaboration platform 110, client storage 204, client device 202, and other systems (e.g., client 104); (4) integrated security technologies to secure connections and content within collaboration platform 110; (5) distribution and execution of application services and backend technologies (e.g., document processing, change management, spreadsheet, metadata management, etc.); and (6) integration with native controiler(s) to create and maintain user accounts.

Agent server 206 may also execute software that collects and maintains internal and external userids, including those based on email addresses, and also retrieves IP information when a user (e.g., an owner or reviewer) logs on to collaboration platform 110 to determine geographic location of the user. In one embodiment, agent server 206 may perform processes that use the retrieved IF address to control and adhere to Country specific data privacy restrictions, such that, for example, workspace views outside of a restricted Country will not be allowed. For example, agent server 206 may prevent a reviewer from the United States from viewing workspace documents that originated from an owner from Sweden based on governing laws that may prevent foreign users from viewing certain information. In one aspect, agent server 206 may maintain and execute one or more rules that analyzes Country identification information extracted from users' IP addresses when they log on to collaboration platform 110 to determine whether to apply access restrictions to a workspace, or documents or content within the workspace. Other types of geographical based access restrictions may also be implemented, such as restrictions based on GPS locations, State, zip code, domain names, etc.

Agent server 206 may also execute software that performs workspace and document administration/configuration functions, such as controlling user or client access, available views, and services based on permissions granted at the time a user account was created. For example, agent server 206 may perform processes that ensure that the identifier (e.g., UID) for each external user id is configured such that there is only one account created for each user and also allows for association to one or more other workspaces.

Agent server 206 may also execute software that performs processes that provide, for example: (1) Viewer Services, which provides the ability for a reviewer or owner to view content either locally or online; (2) Editor Services, which provides the ability for an owner or reviewer to edit documents or content either locally or online; (3) Compare Services, which may send a request to a server or other computer running document comparison applications to provide the ability to compare versions of content or a selection of text against another selection of text and return the results of the request; (4) Metadata Cleaning Service, which may send a request to a server or other computer to provide the ability to clean default metadata (e.g., document statistics, white text, small text, tracked changes and comments) from document content and return the cleaned file to Agent Server 206 for final delivery; (5) Information Rights Management Service, which may send a request to a server or other computer running software to provide the ability to clean content of all default metadata (as described above), stamp/encrypt into the document the originating source information (e.g., Author and Company Names, date and time, etc.) and information relating to a user that the document will be sent to into the property of the document so that the added information cannot be removed by any metadata cleaning solution and return the clean and stamped file to Agent Server 206 for final delivery; (6) PDF/Digital Signature (LDF) Service, which may send a request to a server or other computer running software to provide the ability to convert a document to PDF format and insert a digital signature into the document. In one aspect, if the document is altered in any manner, the software removes the digital signature and invalidates the document and returns the signed document to Agent Server 206 for final delivery.

Clients (e.g., 102, 104) that interconnect with collaboration platform 110 in system environment 100 may employ a system of components similar to the system disclosed in FIG. 2. In one embodiment, an owner (client 102) and a reviewer (e.g., client 104), or multiples thereof, may each utilize the components of client device 202, client storage 204, and agent server 206, all interconnected by the same collaboration platform 110. In accordance with certain embodiments, each user may share documents and content as owners by publishing links on a workspace to collaboration platform 110 through agent server 206 or client device 202. Users may then also review and/or edit documents as reviewers by opening the links on a workspace to the shared documents rendered by collaboration platform 110.

In certain embodiments, reviewers may not need to employ one or more of a client device 202, client storage 204, or agent server 206. For example, the disclosed embodiments may be configured such that a reviewer that provides edits, annotations, and/or comments on an owner's document may access links to the document without the use of agent server 206. As one example, the disclosed embodiments provide for configurations where an owner may grant certain reviewers the option to review linked content via email within, as one example, a browser window. Thus, certain embodiments of the disclosed invention may enable reviewers that do not use an agent server 206 to participate in collaborating with owners.

As described, system 100 provides mechanisms that enable one or more owners to create workspaces containing documents, folders of documents, content, and other information that may be shared over a network with one or more reviewers. Through integration with collaboration platform 110, certain embodiments provide a secure manner of providing customized collaboration where a reviewer may have access to review and/or edit documents in a workspace, but may be prevented from obtaining a copy of the modified document after a communication session with collaboration platform 110 ends. The owner's system, however, is configured to synchronize with the owner's local storage system all changes made by all reviewers (whether done simultaneously or at different times) through collaboration platform 110. Thus, unlike conventional document sharing systems, where information may be maintained at a web-based location, and overwritten when changes are made, the disclosed embodiments provide methods and systems that securely maintain an original document at the original owner's storage system, along with any synchronized updated versions of the document. Moreover, through the workspace concepts disclosed herein, owners can configure and implement collaboration sessions where content can be selectively shared without losing control of the shared content in the workspace to reviewers. For instance, certain embodiments enable collaboration platform 110 to present documents and/or folders to reviewers via browser (or similar software) executing at the reviewer's client computer, but prevents the reviewer's client computer from maintaining copies of the documents in the browser's cache memory. Collaboration platform 110's virtual memory may be configured such that the workspace and documents and folders rendered by collaboration platform 110 is deleted and not available following a communication session with a user. These and other aspects of the disclosed embodiments may be performed by one or more of the components of system 100. The exemplary processes that may be performed by the components are described below.

Figure 3A:
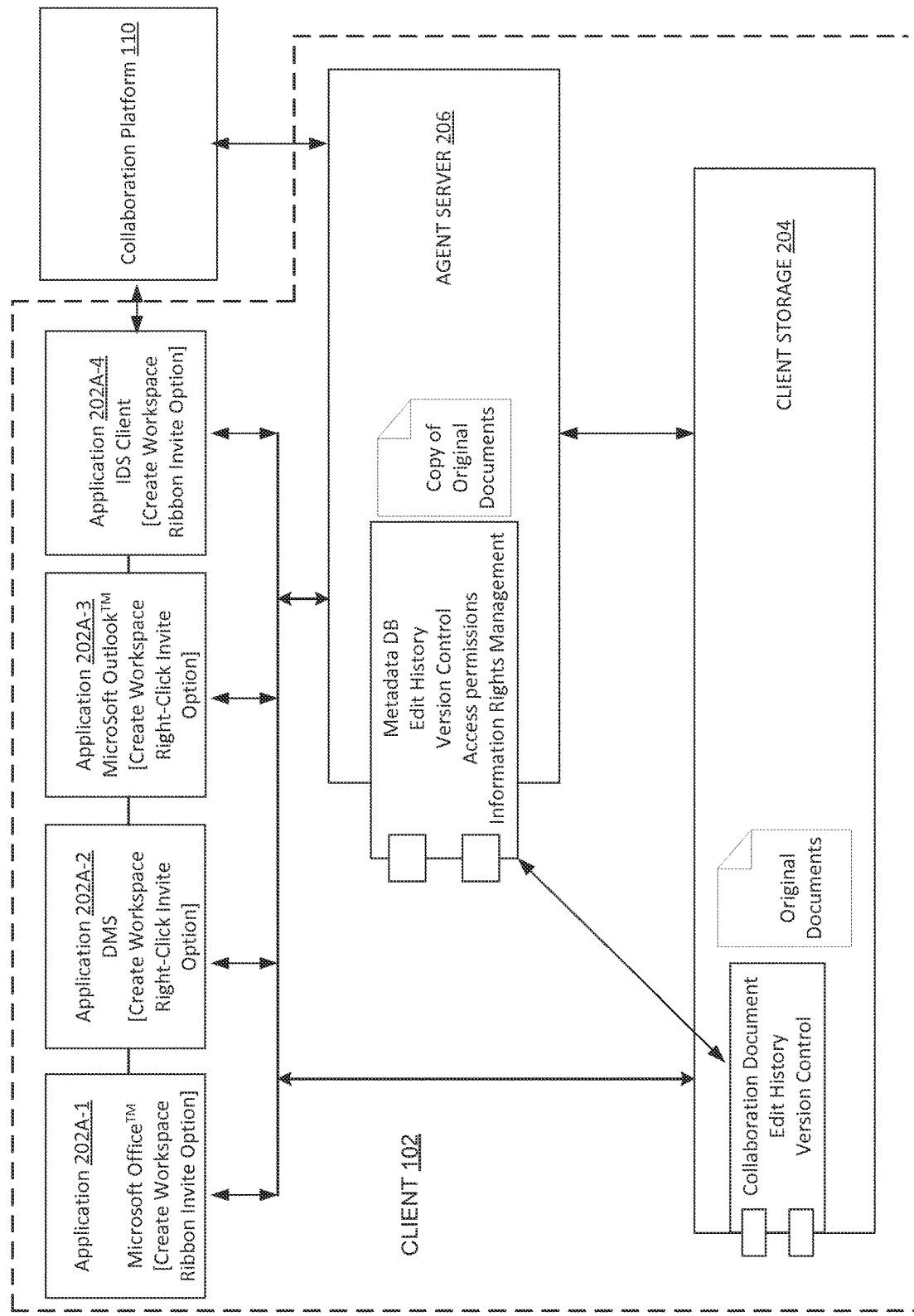
FIG. 3A is a diagram of an exemplary system environment for implementing certain embodiments.

FIG. 3 is a flowchart of an exemplary workspace creation process 300 that may be performed by one or more components of system 100 consistent with certain disclosed embodiments. In one embodiment, the workspace creation process 300 may begin with client device 202. For example, process 300 may begin with agent server 206 receiving a request to create a workspace from client application 202A (Step 305). Depending on the type of application, the request may be generated automatically by client device 202, or it may be generated in response to a user command when running application 202A. For example, application 202A may include an Add-On, menu option, or hot key sequence that initiates a request to create a workspace. FIG. 3A shows an exemplary system with a client (e.g., client 102) that includes, among other things, four client applications 202A-1 to 202A-4 with "create workspace" options.

Agent server 206 may then provide options to client 202 to present to a user operating client 202 to configure views for the workspace (Step 310). In one aspect, embodiments execute processes that render a user interface window containing selections, menus, options, etc. to enable a user to customize and configure a workspace. For example, agent server 206 may provide options to enable a user to select tabs, and areas in workspace that are specific to a user. For example, agent server 206 may provide options for the user to include one or more of the tabs described above in connection with FIG. 1A. In other embodiments, client 202 may provide these options to a user operating client 202 for configuring a workspace. Agent server 206 may receive input from client 202 indicating the configurations and types of views for the workspace and store the information.

Agent server 206 may also provide options to client 202 to present to the user operating client 202 to configure reviewer access rights to views of the workspace (Step 320). In one embodiment, agent server 206 may provide options to allow the user to identify and select access rights to certain views within the workspace for one or more reviewers. For example, a user may allow certain reviewers associated with a business entity access to all views in the workspace, while restricting access by other reviewers associated with the same business entity to one or more of the views of the workspace. The disclosed embodiments also enable the user to configure access rights based on different business entity relationships, geographical locations, domain name characteristics, and any other type of characteristics relating to reviewers or groups of reviewers. In other embodiments, client 202 rather than agent server 206 may provide these access rights options to a user operating client 202.

In certain embodiments, agent server 206 functions as an intermediary between client 202 and collaboration 110 in generating workspaces after configuration is complete. In step 323, agent server 206 assigns a unique identifier to the workspace that is provided to collaboration platform 110. Once the workspace parameters (e.g., access rights, views, and other aspects such as look and feel, controls, tagged with unique identifiers, etc.) are configured, agent server 206 stores the workspace parameters for later use when the workspace is accessed for rendering by collaboration platform 110 (Step 325).

Figure 4:
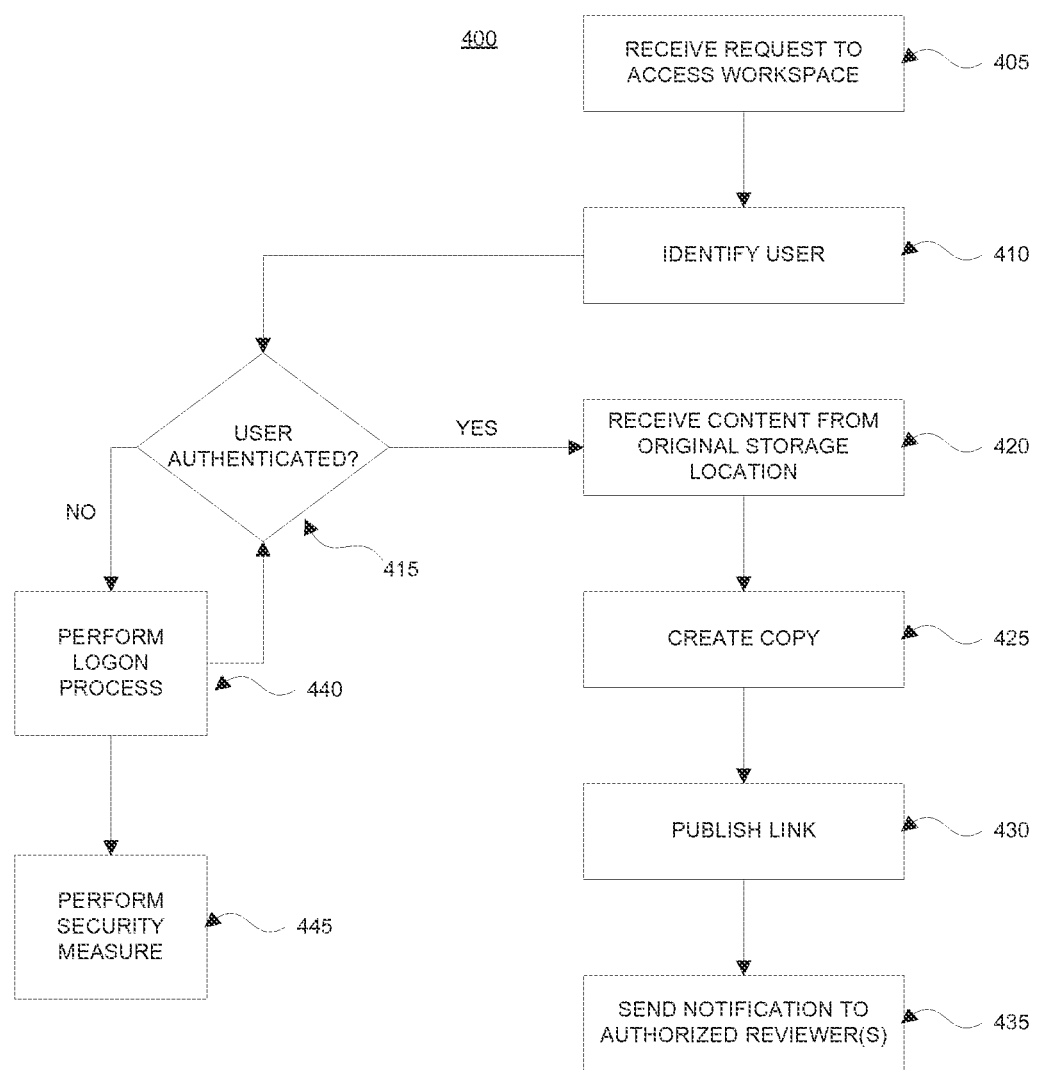
FIG. 4 is a flowchart illustrating an exemplary workspace update process consistent with certain disclosed embodiments.

FIG. 4 is a flowchart illustrating an exemplary workspace update process 400 consistent with certain disclosed embodiments. This workspace update process may be performed by one or more components of system 100. In one embodiment, an owner (e.g., client 102) may publish a content link to a shared workspace in order to share content for review, annotating, and/or editing by authorized reviewers (e.g., client 104). The owner may Share various types of content on the shared workspace 150, including but not limited to documents, folders of documents, database entries, calendar entries, and any other form of content or information. In one embodiment, the owner may initiate the workspace update process after creating a new document or folders of documents, or after updating a document through client application(s) 202A.

To share content, the owner may access the workspace, for example, by initiating a request at client device 202. In one embodiment, agent server 206 receives the request to access the workspace (Step 405). Agent server 206 may then attempt to identify the owner (Step 410). Agent server 206 may then determine whether the owner is authorized to access the workspace based on the user's credentials (Step 415). If so, the process continues to step 420. If not (Step 415; No), agent server 206 may initiate a logon process at Step 440, where the agent server 206 requests and receives from the owner credentials (e.g., a username and/or password) for accessing the workspace. If the owner's user credentials do not match any authorizations, agent server 206 denies the owner access (Step 445). However, if the owner provides the proper credentials, the process continues to step 420.

At step 420, the owner may then select content (e.g., a document, folder of documents, etc.) from an original storage location in client storage 204 to attach to the workspace (Step 420). In one embodiment, client storage 204 may perform processes that create a copy of the original selected document to ensure the original document is maintained in the original source location in client storage 204. Client storage 204 may create a collaboration document (see e.g., FIG. 3A) for this purpose. Agent server 206 may then create and store a copy of the content from client storage 204 (Step 425). In certain embodiments, software processes executed in agent server 206 and client storage 204 may interface and communicate to facilitate the copying of the selected document to agent server 206. In certain embodiments, client storage 204, agent server 206, and/or collaboration platform 110 may each perform respective processes that create entries in edit history tables or activity logs maintained by each of these components that provide a log record of the copy operations of the document (or folder of documents). The log record may include a date and timestamp of the transaction involving the copy of the document (or folder(s)) to agent server 206 for inclusion in the workspace and the identifier relating to the client (e.g., client 102) and/or user that initiated the transaction.

Agent server 206 may then synchronize the newly added document to the workspace with collaboration platform 110. In one embodiment, agent server 206 may publish a link to the copy of the document in the workspace on collaboration platform 110 (Step 430). Agent server 206 may also send a notification to authorized reviewer(s) that indicates the document has been added to the workspace (Step 435). In one embodiment, agent server 206 may send a notification email to authorized reviewers, alerting them to the presence of the new content available on the shared workspace for review and/or editing. In one embodiment, the owner may initiate the email notification through client application 202A. For example, as shown in FIG. 3A, client application 202A may include mechanisms (ribbon invite options, right-click options, etc.) that enable a user working with application 202A to invite one or more reviewers to access the document (or folders) that has been added or modified in the workspace.

In certain embodiments, the email may contain a link to the workspace so that reviewers may log into the workspace to access the shared content through the published link. In other embodiments, the email may contain a link to the workspace provided by collaboration platform 110. The workspace rendered by collaboration platform 110 may include a content link to the copied document hosted by agent server 206, which may be displayed in an editor process (e.g., text editor) for reviewing and/or editing, permitting a reviewer to review and/or edit content in a browser or web-based format. Thus, in certain embodiments, the shared content may not be stored at collaboration platform 110, but instead the content (E.g., documents) are rendered in a web-based format for display at the reviewer's or on the collaboration platform's browser or similar software. In these embodiments, only a published link passes beyond the owner's client (e.g., client 102) through, for example, a firewall, leaving the owner in sole control over the shared content except for any authorizations and access rights provided to one or more reviewers.

In certain embodiments, agent server 206 and/or collaboration platform 110 may generate activity entries which are stored in an activity log of database tables maintained by agent server 206 and/or collaboration platform 110. Agent server 206 and/or collaboration platform 110 may generate these entries whenever a content link is published, notified, accessed, added, saved after editing, closed, or at any other event selected by a user at the time of creating updating, or editing a workspace or publishing a content link. In certain embodiments, the entries may store the following items of information for each transaction with a content link: date, timestamp, user ID, user email address, or any other item of information pertaining to the owner, reviewer, access rights, or content link. For example, the activity entries may also include information about the content link including the linked content's size, owner, version, etc., including information pertaining to any edits or changes made by reviewers or owners. Depending on user authorizations and access rights, collaboration platform 110 may provide, through agent server 206, access by reviewers to activity logs consistent with various disclosed embodiments of the invention. Additionally, client storage 204 may create and update activity logs when an updated version of shared content is synchronized consistent with various disclosed embodiments of the present invention.

For example, agent server 206 and client storage 204 may be configured to create log entries of the notification in their respective edit history tables. (See e.g., FIG. 3A, edit history). The log entries may include a date and timestamp of the notification transaction and an identifier of the user or client that initiated the transaction. Further, agent server 206 may create an activity record of the email address for each recipient of the notification within an invitation table maintained by agent server 206. Agent server 206 may also associated the notification activity record with the email record maintained in the edit history table of agent server 206. Collaboration platform 110 may also create and store such entries and generate activity records either alternatively or in tandem with agent server 206 and/or client storage 204. In certain embodiments, collaboration platform 110 may delete all historical data, such as the activity records, transaction logs, etc. automatically when a communication session ends with a reviewer.

Figure 5:
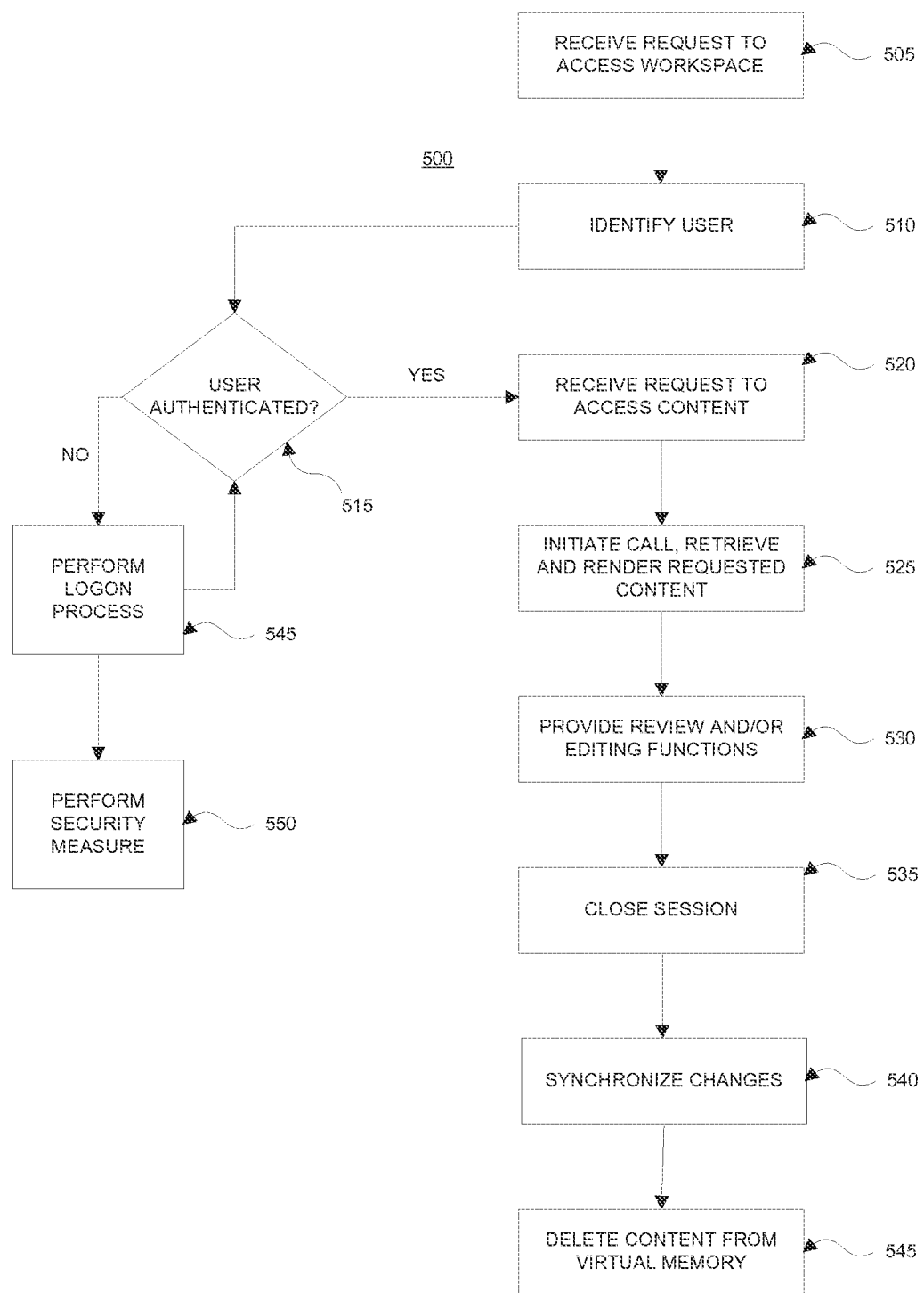
FIG. 5 is a flowchart illustrating an exemplary collaboration review process consistent with certain disclosed embodiments.

FIG. 5 is a flowchart illustrating an exemplary collaboration review process 500, consistent with certain disclosed embodiments of the present invention. This process may be performed by one or more components of system 100. In one embodiment, a reviewer (e.g., client 104) may receive a request to access a workspace from agent server 206 of an owner in accordance with the notification processes described above in connection with FIG. 4. In one aspect of the disclosed embodiment, a reviewer may initiate a request to collaboration platform 110 to access the workspace identified in the notification (or any workspace that the user may wish to attempt to access). The process 500 may also be performed for owners attempting to access a workspace through collaboration platform 110. Collaboration platform 110 may receive the request provided by a client (e.g., client 104) over network 120 (Step 505).

In one embodiment, the reviewer may initiate the request at client device 202. In another embodiment, a user may open a notification email and initiate a request to access the workspace through the link in the email. In certain aspects, agent server 206 of the reviewer client computer may initiate the request via client device 202 of the reviewer's client computer (e.g., client 104). Upon receiving the request, collaboration platform 110 may attempt to identify the user (Step 510), Collaboration platform 110 determines whether the user is authorized to access the workspace (Step 515). If so, collaboration platform 110 may grant the user access to the workspace and the process continues to step 520. If not, collaboration platform 110 may initiate a logon process at Step 545, where it requests and receives credentials from the user (e.g., username and/or password). If collaboration platform 110 determines that the user's user credentials do not match any authorizations, collaboration platform 110 may deny access (Step 550). If the credentials do match, the process continues at step 520 where a communication session is established with the user and collaboration platform 110.

Once the user is authorized, collaboration platform 110 may collect the information relating to the requested workspace from agent server 110, and render the workspace with views based on one or more rules that take into account the requesting user's access rights previously configured by the workspace creator. In one example, platform collaborator 110 may receive decisions of access rights by agent server 206 associated with the owner of the workspace that identifies the views and options that the user is allowed to receive via collaboration platform 110. Upon successfully accessing the workspace, an authorized user may then review the content, including document links, shared on the workspace pursuant to that user's access rights. The user may, for example, access and view the email, calendar, news, history, reporting, activity log, instant messaging features, links to other workspaces, and tabs, menus, dashboard elements, or graphical displays for other matters, features, or projects. Collaboration platform 110 may receive a request to access content selected by the user (Step 520). The requested content may be a request to access a document via a content link displayed in the workspace. In response to receiving an indication that the user selected one of the document links, collaboration platform 110 may initiate a call to agent server 206 of the document owner to establish a connection to display the content of the requested document through collaboration platform 110 (Step 525). In one embodiment, the document and its content remains at the owner's client 202 or agent server 206 in physical memory, and the collaboration platform 110 renders the content in virtual memory, for example via web-based display technologies to a browser or similar software at the reviewer's client system. In certain embodiments, the memory component of collaboration platform 110 may not be accessible to the reviewer or owner users and all documents and folders, content, etc. maintained in virtual memory is deleted from the collaboration platform 110 at the end of a communication session with the reviewer or owner user. Collaboration platform 110 may render the requested document, folder, or content at the reviewer's browser, such that the rendered information is not stored in the cache or temporary memory of the reviewer's browser.

Based on the access rights for the requested content, collaboration platform 110 may provide application services through the web-based service such that the reviewer may view the shared content displayed through a virtual memory by the collaboration platform 110 (Step 525). In certain embodiments, collaboration platform 110 may display the content with a text and/or data editor having functionalities similar to those offered by client application(s) 202A, permitting the reviewer to review, annotate, and/or edit the content in accordance with the user's access rights (Step 530). The virtual memory display may disable any copy, save, and print functions to prevent reviewers 104 from obtaining control over any part of the displayed content. Collaboration platform 110 receives input from reviewers 104 regarding any changes to the content (e.g., changes to text in a document, etc.) and maintains in virtual memory the changes in accordance with the document editing features offered by the platform. Collaboration platform 110 may receive an indication once the reviewer has completed collaboration activities (e.g., log off), and in response closes the communication session with the reviewer (Step 535). Collaboration platform 110 may initiate synchronization processes with agent server 206 of the owner to provide activity information and changes to agent server 206 (Step 540). Once synchronization is complete, collaboration platform 110 may select content from the virtual memory, including all information relating to the requested, viewed, and edited content for the reviewer's workspace (Step 545). In one embodiment, a container is provided from collaboration platform 110 to agent server 206 over network 120 before the collaboration platform 110 deletes the information relating to the content. In another embodiment, agent server 206 may receive an indication that synchronization is required and retrieves the updated information over network 120 before deletion by the collaboration platform 110.

Figure 6:
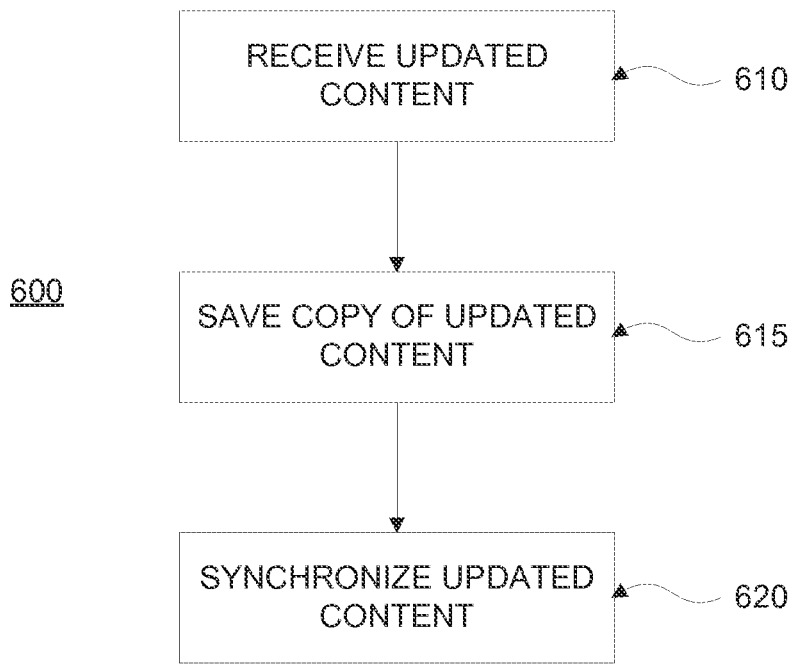
FIG. 6 is a flowchart illustrating an exemplary synchronization process consistent with certain disclosed embodiments.

FIG. 6 is a flowchart illustrating an exemplary synchronization process 600 consistent with disclosed embodiments. In one embodiment, agent server 206 may receive synchronization information from collaboration platform 110 following a collaboration session with a reviewer, such as that described above in connection with FIG. 5. Agent server 206 may receive the updated content for a document or set of documents (Step 610) and save a copy of the content and changes in memory (Step 615). In one embodiment, agent server 206 saves each change as an individual database object to a Changes Table that is associated with the email address of the Reviewer that made the changes. Agent server 206 may also create an activity entry to log the save operation to the Edit History Table in an agent server 206 database with the date and timestamp of the transaction, along with the email address of the reviewer that initiated the transaction.

Agent server 206 may then synchronize the changes with client storage 204 (Step 620). In one embodiment, agent server 206 communicates with client storage 204, which creates a new document version (Collaboration Document) associated with the original document that was edited, which may or may not be in a proprietary file format, and sets security access rights to client storage 204 Userid relating to the original transaction that created the document or content. Agent server 206 may then synchronize the changes to the created Collaboration Document and create several activity entries to (1) log the create operation to a versions table, (2) log the save operation to the edit history table with the date and timestamp of the transaction using the Userid from the original transaction, and (3) log the email address of the reviewer that made the changes to the document. Client storage 204 also logs the save operation in its edit history table with the same date and timestamp and Userid information, and logs the create operation in corresponding version table maintained by client storage 204. In some embodiments, client storage 204 or agent server 206 may further harmonize multiple Collaboration Documents corresponding to the changes, such as annotations, edits, etc. of various reviewers, generating a Master Document incorporating the alterations and edits from each Collaboration Document, for example in redline or other editing format, to provide an owner with a comprehensive version for review.

In certain embodiments, after agent server 206 has synchronized the updated content to client storage 204, agent server 206 may republish the content link on the workspace for subsequent access by authorized reviewers, enabling full or partial bi-directional synchronization between the content stored at client storage 204 and the content links on workspace 150 that is rendered by collaboration platform 110. In certain embodiments, this republished link may display the updated version with changes in redline, or in other embodiments without redline. Thus, the republished link may provide display the Master Document, or in other embodiments multiple links may display various Collaboration Documents reflecting the annotations and edits of certain reviewers 104. Collaboration platform 110 may also provide services that enable reviewers to view changes to a shared document made by multiple reviewers (and the owner) in real-time. Thus, in certain embodiments, collaboration platform 110 may enable reviewers to access the latest versions of content by automatically republishing links whenever the linked content is updated. Additionally, collaboration platform 110 may provide notifications, such as emails or other messages, to reviewers who have a linked document open in virtual memory when that document is updated by another user and a link is republished, providing options to synchronize the updates with the reviewer's current alterations, annotations, edits, or other changes.

In other embodiments, agent server 206 may be configured to present the republishing of content links based on parameters set by an owner of a document. For example, if a document owner 102 does not wish for reviewers to access each other's edits and alterations until the owner reviews them, agent server 206 may allow the owner to manually republish a link to the document. As another example, agent server 206 may be configured to allow an owner 102 to suspend or lock a document from further editing, or delete the link from a workspace. Agent server 206 may also be configured to enable the owner 102 to reopen editing and review of a document by allowing the owner 102 to manually republish a link to continue the collaborative process. In another embodiment, if an owner 102 decides that enough editing has occurred and that review is complete, the owner may then use features provided by agent server 206 to republish a link using, for example, an Approved Content option of a workspace. Agent server 206 may also allow an owner to provide a link to solicit final approval or comments from reviewers 104 through an approval process that may be executed by components of system 100 consistent with certain disclosed embodiments.

With certain information or documents, owners may desire to share their own latest available updates in real time with various reviewers. In accordance with certain embodiments of the invention, agent server 206 and/or client storage 204 may be configured with software that when executed automatically updates workspaces whenever content is updated in a document by an owner. For example, upon completion of changes to a document via client application 202A, client device 202 may notify client storage 204 that a change was made to the document. In response, client storage 204 may initiate synchronization processes where a Collaboration Document is created that corresponds to the original document (see e.g., FIG. 3A) and the changes are synchronized with agent server 206 for updating the links for that document in any appropriate workspaces.

As described above, certain disclosed embodiments permit single or multiple owner(s) (e.g., client 102) and single or multiple reviewer(s) (e.g., client 104) to connect to collaboration platform 110 for sharing documents, folders of documents, content, etc., in various combinations of shared workspaces. Certain embodiments also provide for the bi-directional synchronization of, for example, documents between the client storage 204 and agent server 206 of an owner (e.g., client 102) with the document links published to the workspaces on collaboration platform 110, such that reviewers (e.g., client 104) that access document links included in the workspace may access up-to-date content, and owners accessing documents stored on their own systems (e.g., client 102) may also have access to up-to-date content. In further embodiments, owners may configure user authorizations and access rights, limiting the rights of reviewers to maintain security and control over the owners' documents. In still further embodiments, the disclosed embodiments may host and provide various other applications and functionalities in conjunction with the collaboration, synchronization, and security systems and processes described above.

Other embodiments will be apparent to those skilled in the art from consideration of the specification and practice of the features disclosed herein. Further, the sequence of processes steps disclosed in connection with the figures is not intended to be limiting. Additional or fewer steps may be implemented in a manner consistent with certain features of the disclosed embodiments. In some embodiments, an owner 102 may configure a workspace 150 at client 202 or client application 202A, and the client 202 may then provide input to agent server 206 to store the workspace parameters for use when the workspace 150 is accessed for rendering by the collaboration platform 110. An owner 102 may then, consistent with certain embodiments, share content over the workspace 150 by publishing links to copies of documents stored in at agent server 206. In order to view, annotate, and/or edit shared content, reviewers 104 may then access the workspace 150 through a client 202 or through a link in a notification email and access document links consistent with individual access rights. As one example of this process, the agent server 206 may function as a transitional content repository, with the collaboration platform 110 displaying in virtual memory the content stored in physical memory at the agent server 206. The collaboration platform stores no information or data related to the accessed content, temporary or otherwise, that is accessible to any owner 102 or reviewer 104. Reviewers 104 may then view, annotate, and/or edit the content within the virtual memory, closing the content when the session is complete.

Consistent with certain embodiments, the collaboration platform 110 may then send the updated content to the agent server 206 via a container, or the agent server 206 may retrieve the updated content from the collaboration platform 110. After this exchange, the collaboration platform 110 closes the content and deletes all information and data related to the content. The agent server 206, having received the updated content, may then save it as a Collaboration Document in a collaboration file format such as, for example, as a Liters .ids file. The agent server 206 may then synchronize this new Collaboration Document file with the client storage 204, and either the agent server 206 or client storage 204 may incorporate various updated versions into a Master Document containing all updates, which may enable an owner 102 to efficiently review all annotations and edits at once. Consistent with certain embodiments, the agent server 206 may then automatically republish a document link, providing access to the Master Document, a Collaboration Document, the original unaltered document, or some combination of these depending on the various access rights and configurations established for the document and/or the workspace 150. Accordingly, certain embodiments may provide for bi-directional synchronization at the owner (e.g., client 202 and/or client storage 204) and reviewer levels (workspace 150), such that the owner(s) and reviewer(s) each have access to the most current and up-to-date content.

Owners and authorized reviewers may also configure varying access rights consistent with certain embodiments of the disclosed invention. Depending on access rights and configurations, each owner 102 and reviewer 104 may have access to links providing access to different versions of the content; for example, one reviewer 104 may be able to access the Master Document while other reviewers 104 may only have access to the original unaltered document or perhaps may not receive a republished link at all. In other embodiments, an owner 102 may select access rights and configurations to prevent automatic republishing of links, which may provide the owner 102 an opportunity to review any updates before deciding whether to share them. At each step of the various processes described herein consistent with various embodiments of the claimed invention, including accessing content, sharing content via links, saving content, synchronizing content, etc., one or more components of client 102, 104 may create and save activity log entries including information such as a timestamp, userid, user contact information, edit history, among others.

To further illustrate certain aspects of the disclosed embodiments, consider an example where an owner uses a word processing application (e.g., 202A) to create a workspace via an option provided as an Add-on or a hot key sequence in the application. The owner may create the workspace (called Workspace 1 for illustration purposes). Using the workspace configuration features of the disclosed embodiments, the owner may assign user 1, user 2, and user 3 with certain access rights to the workspace. The owner creates and links a document having a format associated with the word processing application (called document "222.doc" for illustration purposes). Once completed, the workspace configuration information set by the owner is sent to agent server 206, which takes and maintains a copy of document 222.doc in local memory. Agent server 206 enables the owner to set access rights for one or more reviewers of document 222.doc. In this example, the owner allows users 1 and 2 to have viewing and editing rights to document 222.doc and only allows user 3 to have viewing rights to document 222.doc. Once configured, agent server applies the permissions to the view for document 222.doc in Workspace 1.

At some point, users 1, 2, and 3 may receive notifications via agent server 206 or client application 202A, that document 222.doc is available in Workspace 1, and thus accesses collaboration platform 110 through their respective browsers (or similar software). For each user, collaboration platform 110 may create Workspace 1 in a web-based format using virtual memory. In this example, collaboration platform 110 may generate a workspace content that includes a folder called "Workspace 1" that corresponds to the workspace created by the owner. Agent server 206 publishes the document 222.doc as a content link in Workspace 1, which is rendered by collaboration platform 110. Because, in this example, the owner only provided access rights to users 1-3, any other users who access the workspace via collaboration platform 110 will not see the folder "Workspace 1."

Each user (users 1-3) may click on the Workspace 1 folder link rendered by collaboration platform 110 to view the content in the folder. In this example, a content link to document 222.doc may be displayed. As each user clicks on the content link for document 222.doc, the collaboration platform 110 through agent server 206, automatically updates status fields in the workspace, such as "under review," etc. Aspects of the disclosed embodiments enable agent server 206 to populate the list of content links to documents rendered by collaboration platform 110. In this way, collaboration platform 110 may be connected to agent server 206, but not with the data storage 204 that hosts the original document 222.doc. Thus, in certain aspects, agent server 206 may act as a clearinghouse for all permissions, access rights, etc. for the content and documents in Workspace 1. When, for example, user 1 views and clicks on the content link for document 222.doc, collaboration platform 110 provides for the link to be directed to agent server 206, which allows the content to open in the browser of user 1. In one embodiment, document 222.doc may not be rendered in user 1's browser as the word processing application document. Instead, the document 222.doc may be converted into HTML or other formats that user 1's browser is configured to accept and present.

Figure 7:
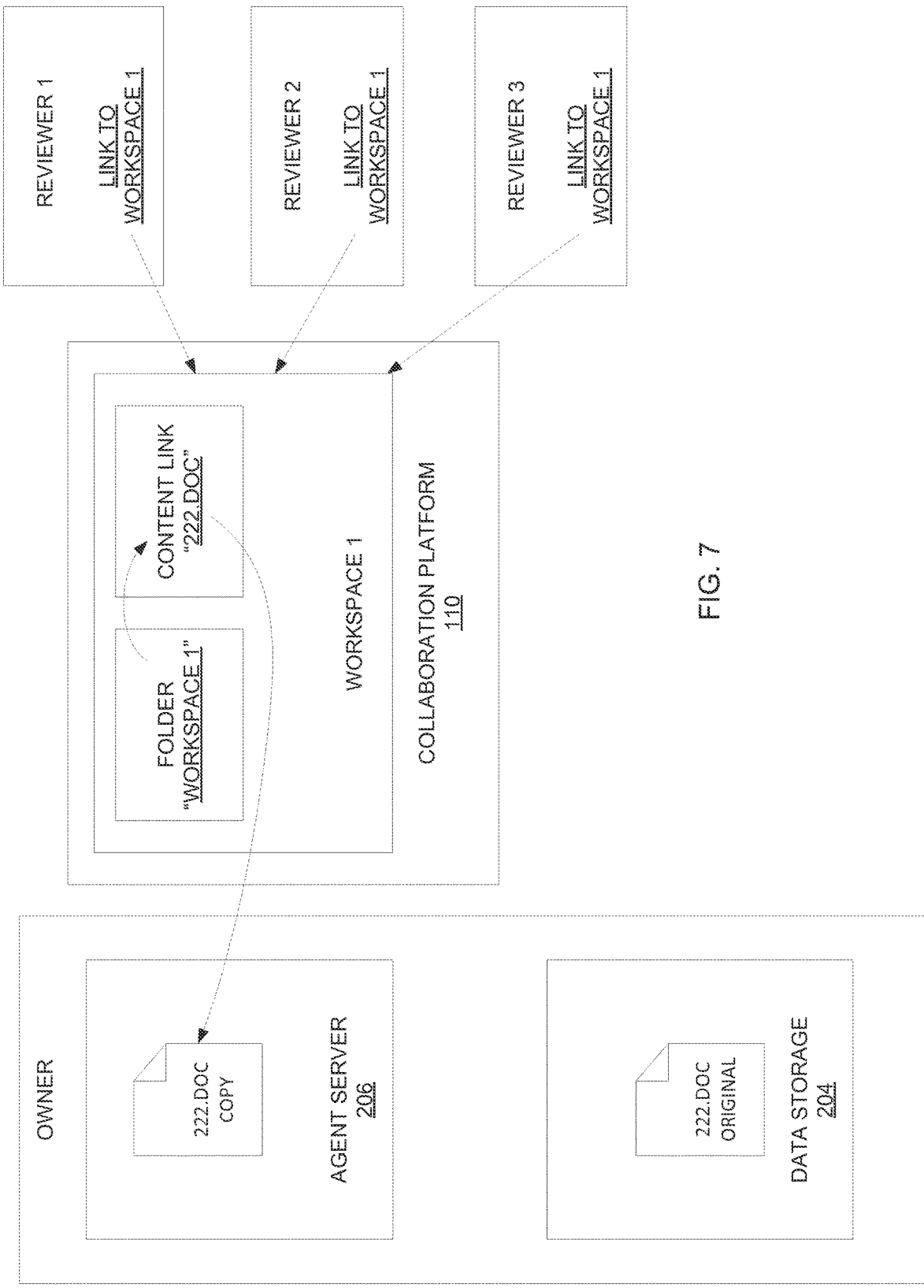
FIG. 7 is a diagram of an exemplary system environment relating to reviewer collaboration processes consistent with certain disclosed embodiments.

FIG. 7 shows an exemplary block diagram of a system involving collaboration processes consistent with certain disclosed embodiments. In the example shown in FIG. 7, reviewer 1 (user 1), reviewer 2 (user 2), and reviewer 3 (user 3) receive notifications including links to workspace 1 that provides access to workspace 1 rendered by collaboration platform 110. FIG. 7 also shows workspace 1 including the folder "workspace 1" which provides a link to all documents included in that folder, which in this example, includes a content link to document 222.doc. When selected, the content link to 222.doc links to the copy of document 222.doc maintained by agent server 206. FIG. 7 also shows data storage 204 at the owner that maintains the original document 222.doc, which is separate from any connections to collaboration platform 110.

Upon completion of edits by user 1 via user 1's browser, user 1 may close the document via collaboration platform 110. In response, collaboration platform 110 may provide the content including the changes made by user 1 to agent server 206. Agent server 206 may then convert the document 222.doc into another format, such as a Litera IDS format (222.IDS) or other formats usable by the owner's client system. Agent server 206 may then log the changes for user 1. Agent server 206 may synchronize the user 1 changes with data storage 204 to create a secondary file (e.g., a collaboration document) for user 1. Secondary files are created for each reviewer (e.g., user 1 and user 2) that created changes to the document. In certain embodiments, the secondary file may include for each reviewer the changes for each paragraph or portion of document 222.IDS. Once synchronized, collaboration platform 110 may delete the document content from its virtual memory. In other embodiments, collaboration platform 110 may delete the document content (and any other related information) from its virtual memory when agent server 206 receives the changes to document 222.doc and the communication session with user 1 is closed. The sessions between collaboration platform 110 and user 1 and user 2 may take place simultaneously or at different times.

Figure 8:
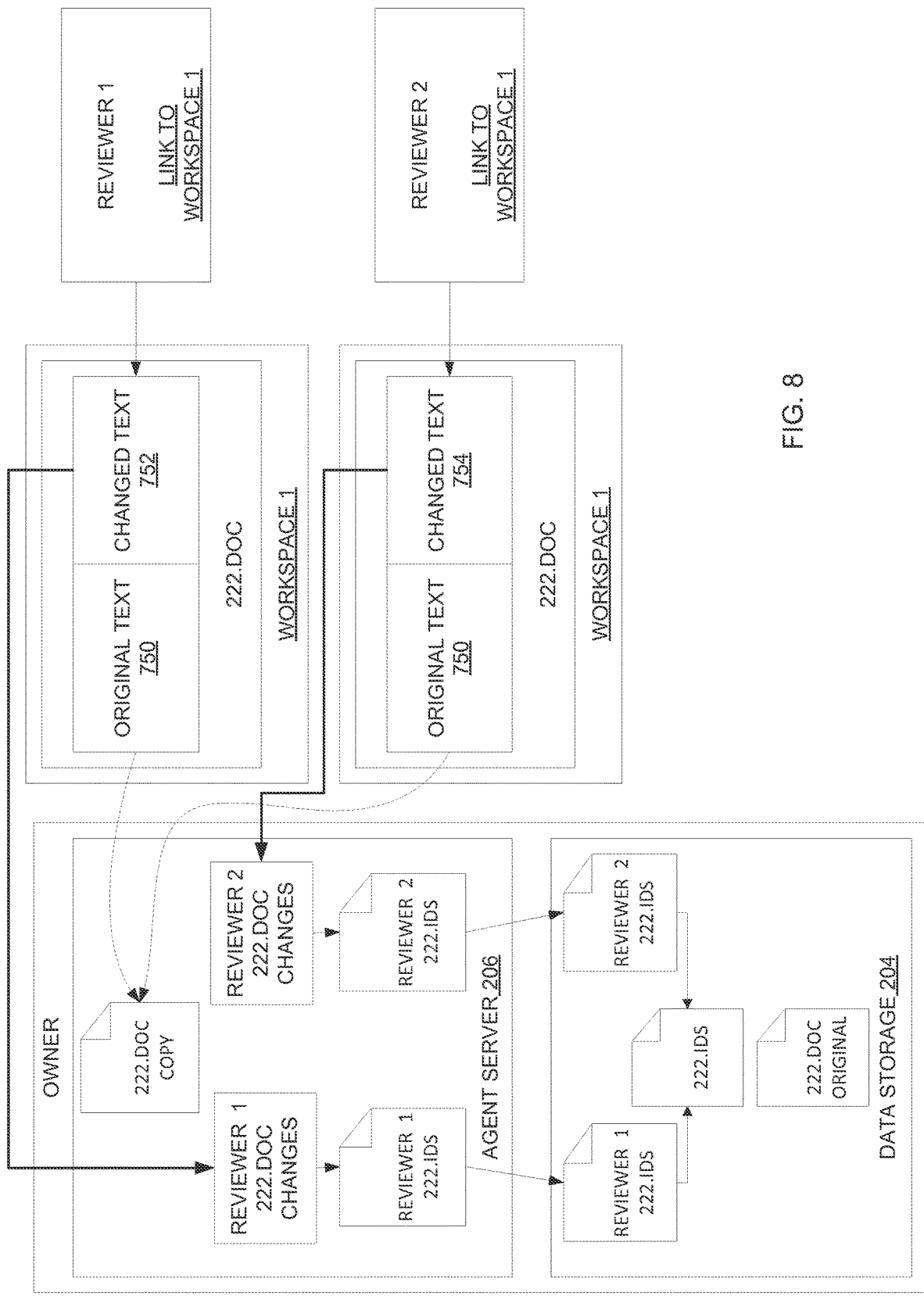
FIG. 8 is a diagram of an exemplary system environment relating to collaboration synchronization processes consistent with certain disclosed embodiments.

FIG. 8 shows an exemplary block diagram of collaboration synchronization processes consistent with certain disclosed embodiments. FIG. 8 shows a collaboration environment relating to system 100 where reviewer 1 creates changed text 752 to original text 750 of document 222.doc rendered in workspace 1 for reviewer 1 during a communication session between collaboration platform 110 and reviewer 1's client system. FIG. 8 also shows reviewer 2's changed text 754 to original text 750 of document 222.doc that is rendered in workspace 1 for reviewer 2 during a communication session between collaboration platform 110 and reviewer 2's client system. The changed text for each reviewer (e.g., changed text 752 and 754) is provided to agent server 206 for creation of a separate document in a different format than the original document's format. In this example, reviewer 1 document 222.IDS is created to reflect the changes made by reviewer 1 to original text 750 of document 222.doc and reviewer 2 document 222.1DS is created to reflect the changes made by reviewer 2 to original text 750 to the original text 750 of document 222.doc. FIG. 8 also illustrates the result of synchronization between agent server 206 and data storage 204 such that secondary file, reviewer 1 222.IDS, is created and maintained by data storage 204 and a secondary file, reviewer 2 222.IDS, is created and maintained by data storage 204. In one embodiment, data storage 204 may execute processes that combine the information included in the secondary files to create and maintain a secondary file, 222.IDS, which reflects the original text 750 and all changes to the text (e.g., 752 and 754) of original document 222.doc. In another embodiment, data storage 204 may enter the information included in the secondary files into a database that reflects the original text 750 and all changes to the text (e.g., 752 and 754) of original document 222.doc such that the changes are stored separate from but parallel to the original document 222.doc itself. The corresponding application executed by the owner's client system (in this example a Liters IDS application) may be used by the owner to perform review of the changes stored in a secondary file (e.g., 222.IDS) or in a separate database. In one aspect, those changes may be viewed and processed in a manner consistent with the features disclosed in U.S. Pat. No. 7,818,678, entitled "Collaborative Document Development and Review System," issued Oct. 19, 2010, the disclosure of which is herein incorporated by reference in its entirety.

Certain embodiments may also be implemented that use other formats than the .IDS format described above in connection with FIG. 8.

In certain aspects, as long as the owner does not close the original document 222.doc, users may collaborate and make changes to the document without overriding other user changes through the collaboration platform 110. Thus, data storage 204 may maintain a converted document, 222.IDS maintained by data storage 204 will contain both user 1 and user 2 changes as long as the owner does not lock the document from further editing (that can be done at anytime) which would change the status filed to "review complete" in workspace 1. If at that time, the owner does close the original document, review is complete and the underlying new formatted application (e.g., IDS application in this example) may allow the owner to publish the document as a new version (e.g., document 222.1.doc). This process allows the owner to receive changes from authorized reviewers (e.g., user 1 and user 2), but also enable another user (e.g., user 3) to later review it. In this example, the owner may publish the document as a new version (e.g., 222.1.doc) and the collaboration process may continue with user 3 having access to the document via collaboration platform 110. Accordingly, certain embodiments enable bi-directional synchronization between the owner(s) and reviewer(s).

As explained above, the owner is able to review the changes made by reviewers using, for example the Litera IDS features described in U.S. Pat. No. 7,818,678. Moreover, in one embodiment, collaboration platform 110 may be configured to provide editing features that provide similar review and collaboration features disclosed by U.S. Pat. No. 7,818,678

The disclosed embodiments may be implemented in a number of environments to facilitate collaborations in real time over the Internet where control is retained by an owner over created documents and content. For example, owners may restrict the rights of reviewers to single-access sessions, where after a reviewer completes a communication session where they access and possible edit documents via a link on a workspace the link may be deleted—not updated and republished. In other embodiments, owners may restrict the rights of reviewers by only permitting access to static links, where reviewers may access links to the version of a document originally shared by an owner on the workspace, but this link may not be updated and republished as owners and reviewers with greater access rights update the document over time. In still other embodiments, owners may permit reviewers to annotate or edit content, and may permit certain reviewers to review other certain reviewers' annotations and edits, but may quarantine other reviewers by denying them access to review certain reviewers' annotations and edits. Thus, owners may create and generate highly individualized combinations of access rights to achieve various purposes, whether security-based, work quality-based, or otherwise.

Various disclosed embodiments of the present invention may also be implemented in different interactive contexts. For example, certain embodiments may be utilized to streamline medical record sharing in a secure environment. Currently, many doctors and hospitals maintain their own files, and sharing files requires requests between institutions. This often involves a transmission delay, hampering the health care of patients as they will often need to schedule follow-up appointments due to the delay in sharing, reviewing, and acting on medical information originating from remote locations. With certain disclosed embodiments of the present invention, a doctor or a doctor's staff may set up a workspace for a given patient. The doctor and patient may operate as both owners 102 and reviewers 104 of medical records and other information shared over the workspace on the collaboration platform 110. If a patient later sees a new doctor, the patient may be able to grant the new doctor access to the workspace as a new reviewer 104. Depending on the new doctor's access rights, the new doctor may then share additional medical records and information and access pre-existing records. As a result, all doctors with access to the patient's workspace may access the latest updated versions of the patient's healthcare records to provide the most current and up-to-date care. Furthermore, doctors may collaborate over a patient's workspace via email or messaging, through making and sharing calendar entries, or by commenting on, annotating, and/or editing linked medical records. The patient, by setting access rights, may remove certain doctors as reviewers 104 when the patient is no longer seeing those doctors and otherwise maintain desired levels of confidentiality arid restricted access. Additionally, the patient may provide access to various family members, guardians, or other trusted individuals. By utilizing various disclosed embodiments of the present invention, access to medical records may shift from the current health center-oriented system to a patient-centric system.

Certain embodiments may also be utilized in an educational context, facilitating teachers and students in sharing ideas and information over a collaboration platform 110 in a safe and secure system, but allowing the educators to prevent the students from obtaining copies of original documents through collaboration platform 110. Still other embodiments may enable law firms and their clients to share documents for reviewing, signing, editing, etc. while retaining control over their own shared content. Still others may enable various distinct law enforcement agencies, for example state and federal entities, to collaborate and share information regarding an investigation over a shared and secure workspace 150. Consistent with certain embodiments, the disclosed invention may also create, enable and/or provide various customized or industry-specific templates to further enhance collaboration.

In these or any other interactive contexts, multiple collaboration platforms 110 may be implemented that provide collaboration features consistent with the disclosed embodiments between the same or different owners and/or reviewers. It is intended that the specification and examples be considered as exemplary only, with a true scope and spirit of the disclosed embodiments being indicated by the following claims.

What is claimed is:

1. A computer-based system for integrating versions of electronic documents comprising:
   a processor; and
   a memory coupled to the processor, the memory storing instructions to direct the processor to perform operations comprising:
      receiving a first version of an electronic document from a first storage device, the first version of the electronic document being edited by a first user, the electronic document being an original copy, the first version being a first copy of the electronic document that is identical to the original copy prior to being edited by the first user,
      receiving a second version of the electronic document from a second storage device, the second version of the electronic document being edited by a second user separate from and independent of edits made by the first user to the first version of the electronic document, the second copy being identical to the original copy prior to being edited by the second user,
      receiving a third version of the electronic document from the first storage device or the second storage device, the third version of the electronic document being edited by the first user, the second user, or a third user,
      generating a master version of the electronic document that incorporates alterations made to the electronic document in each of the first, second, and third versions,
      generating a document history table, generating one or more entries in the document history table corresponding to the alterations made to the electronic document in each of the first, second, and third versions, providing the master version of the electronic document and the document history table to an owner or reviewer of the electronic document; and in response to the generating the master version of the electronic document, causing removal, from at least one of the first storage device and the second storage device, the first version of the electronic document and the second version of the electronic document.

2. The computer-based system of claim 1, wherein the first storage location is a local client storage device.

3. The computer-based system of claim 1, wherein the second storage location is a network storage device.

4. The computer-based system of claim 1, wherein the second storage location is a document management system.

5. The computer-based system of claim 1, wherein the second storage location is an internet-based storage system.

6. The computer-based system of claim 1, wherein the first, second, and third versions of the electronic document are each of a different file type.

7. The computer-based system of claim 1, wherein the master version of the electronic document and the document history table are sent to a reviewer associated with one or more of the first, second, or third versions of the electronic document.

8. A method for integrating versions of electronic documents comprising:

receiving a first version of an electronic document from a first storage device, the first version of the electronic document being edited by a first user, the electronic document being an original copy, the first version being a first copy of the electronic document that is identical to the original copy prior to being edited by the first user, receiving a second version of the electronic document from a second storage device, the second version of the electronic document being edited by a second user separate from and independent of edits made by the first user to the first version of the electronic document, the second copy being identical to the original copy prior to being edited by the second user, receiving a third version of the electronic document from the first storage device or the second storage device, the third version of the electronic document being edited by the first user, the second user, or a third user, generating a master version of the electronic document that incorporates alterations made to the electronic document in each of the first, second, and third versions, generating a document history table, generating one or more entries in the document history table corresponding to the alterations made to the electronic document in each of the first, second, and third versions, sending the master version of the electronic document and the document history table to an owner or reviewer of the electronic document, and in response to the generating the master version of the electronic document, causing removal, from at least one of the first storage device and the second storage device, the first version of the electronic document and the second version of the electronic document.

9. The method of claim 8, wherein the first storage location is a local client storage device.

10. The method of claim 8, wherein the second storage location is a network storage device.

11. The method of claim 8, wherein the second storage location is a document management system.

12. The method of claim 8, wherein the second storage location is an internet-based storage system.

13. The method of claim 8, wherein the first, second, and third versions of the electronic document are each of a different file type.

14. The method of claim 8, wherein the master version of the electronic document and the document history table are sent to a reviewer associated with one or more of the first, second, or third versions of the electronic document.

15. A non-transitory computer readable medium storing instructions which, when executed, cause a processor of a server to perform operations for integrating versions of electronic documents, the operations comprising:

receiving a first version of an electronic document from a first storage device, the first version of the electronic document being edited by a first user, the electronic document being an original copy, the first version being a first copy of the electronic document that is identical to the original copy prior to being edited by the first user, receiving a second version of the electronic document from a second storage device, the second version of the electronic document being edited by a second user separate from and independent of edits made by the first user to the first version of the electronic document, the second copy being identical to the original copy prior to being edited by the second user, receiving a third version of the electronic document from the first storage device or the second storage device, the third version of the electronic document being edited by the first user, the second user, or a third user, generating a master version of the electronic document that incorporates alterations made to the electronic document in each of the first, second, and third versions, generating a document history table, generating one or more entries in the document history table corresponding to the alterations made to the electronic document in each of the first, second, and third versions, sending the master version of the electronic document and the document history table to an owner or reviewer of the electronic document, and in response to the generating the master version of the electronic document, causing removal, from at least one of the first storage device and the second storage device, the first version of the electronic document and the second version of the electronic document.

16. The computer-readable medium of claim 15, wherein the first storage location is a local client storage device.

17. The method of claim 15, wherein the second storage location is a network storage device, document management system, or internet-based storage system.

18. The method of claim 15, wherein the first version of the electronic document is of a different file type than the second version of the electronic document.

19. The method of claim 15, wherein the first, second, and third versions of the electronic document are each of a different file type.

20. The method of claim 15, wherein the master version of the electronic document and the document history table are sent to a reviewer associated with one or more of the first, second, or third versions of the electronic document.

\* \* \* \* \*